(12) United States Patent
Enomoto et al.

(10) Patent No.: US 11,102,826 B2
(45) Date of Patent: Aug. 24, 2021

(54) TERMINAL DEVICE, BASE STATION DEVICE, MME, AND COMMUNICATION CONTROL METHOD

(71) Applicant: Sharp Kabushiki Kaisha, Sakai (JP)

(72) Inventors: Masayuki Enomoto, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/953,125

(22) Filed: Apr. 13, 2018

(65) Prior Publication Data

US 2018/0234792 A1    Aug. 16, 2018

Related U.S. Application Data

(63) Continuation of application No. 15/525,868, filed as application No. PCT/JP2015/081456 on Nov. 9, 2015, now abandoned.

(30) Foreign Application Priority Data

Nov. 11, 2014  (JP) .................................. 2014-228505

(51) Int. Cl.
*H04W 76/10*   (2018.01)
*H04W 4/029*   (2018.01)
(Continued)

(52) U.S. Cl.
CPC .............. *H04W 76/10* (2018.02); *H04W 4/02* (2013.01); *H04W 4/029* (2018.02); *H04W 36/12* (2013.01);
(Continued)

(58) Field of Classification Search
CPC .............................. H04W 60/00; H04W 80/04
(Continued)

(56) References Cited

U.S. PATENT DOCUMENTS 8,811,985 B2   8/2014 Tanabe et al.
9,137,833 B2   9/2015 Naoe et al.
(Continued)

FOREIGN PATENT DOCUMENTS

CN      101641973 A    2/2010
JP      2014-045513 A  3/2014
(Continued)

OTHER PUBLICATIONS

3GPP TR 22.828 V13.0.0 (Jun. 2014), Technical Report, 3rd Generation Partnership Project; Technical Specification Group Services and System Aspects; Study on co-ordinated Packet data network GateWay (PGW) Change for Selected IP Traffic Offload (CSIPTO) (Release 13), 18 pgs.
(Continued)

*Primary Examiner* — Nghi H Ly
(74) *Attorney, Agent, or Firm* — Birch, Stewart, Kolasch & Birch, LLP

(57) ABSTRACT

An MME detects that a PDN connection is not effective and changes from a non-optimal gateway to a bearer established in a PDN connection using a more optimal gateway as an endpoint node. This configuration allows an already-established PDN connection to switch to a new PDN connection using the more optimal gateway, which achieves optimal communication control for continuing communication of UE.

8 Claims, 7 Drawing Sheets

(51) Int. Cl.
*H04W 80/04* (2009.01)
*H04W 36/12* (2009.01)
*H04W 76/22* (2018.01)
*H04W 4/02* (2018.01)
*H04W 88/16* (2009.01)
*H04W 60/04* (2009.01)

(52) U.S. Cl.
CPC ......... *H04W 36/125* (2018.08); *H04W 76/22* (2018.02); *H04W 80/04* (2013.01); *H04W 60/04* (2013.01); *H04W 88/16* (2013.01)

(58) Field of Classification Search
USPC .... 455/414.3, 414.1, 435.2, 418, 422.1, 428
See application file for complete search history.

(56) References Cited

U.S. PATENT DOCUMENTS

| | | | |
|---|---|---|---|
| 9,743,437 B2 | 8/2017 | Naoe et al. | |
| 9,826,389 B2 | 11/2017 | Karampatsis et al. | |
| 2004/0028009 A1* | 2/2004 | Dorenbosch | H04W 36/0011 370/329 |
| 2006/0034272 A1* | 2/2006 | Kawakami | H04L 29/12292 370/389 |
| 2009/0016345 A1* | 1/2009 | Tsuchiya | H04L 12/18 370/390 |
| 2010/0054135 A1* | 3/2010 | Rahman | H04L 29/12952 370/242 |
| 2010/0105385 A1 | 4/2010 | Tanabe et al. | |
| 2012/0020318 A1 | 1/2012 | Naoe et al. | |
| 2012/0257598 A1 | 10/2012 | Karampatsis et al. | |
| 2013/0039337 A1* | 2/2013 | Hwang | H04W 36/0066 370/331 |
| 2015/0351141 A1 | 12/2015 | Naoe et al. | |
| 2016/0073283 A1* | 3/2016 | Grayson | H04W 76/025 370/230 |
| 2018/0077560 A1 | 3/2018 | Karampatsis et al. | |

FOREIGN PATENT DOCUMENTS

| | | |
|---|---|---|
| JP | 2014-509820 A | 4/2014 |
| WO | WO 2010/109902 A1 | 9/2010 |
| WO | WO 2012/134566 A1 | 10/2012 |

OTHER PUBLICATIONS

3GPP TR 23.829 V10.0.1 (Oct. 2011), Technical Report, 3rd Generation Partnership Project; Technical Specification Group Services and System Aspects; Local IP Access and Selected IP Traffic Offload (LIPA-SIPTO), (Release 10), 43 pgs.

3GPP TS 23.401 V13.0.0 (Sep. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), 308 pgs.

Alcatel_Lucent, "Support of LIPA/SIPTO@LN in co-located mode, for Small Cell Enhancement work in RAN", S2-140336, SA WG2 Meeting #101, Taipei, Taiwan, Jan. 20-24, 2014. 1 pg.

Intel, Orange, Samsung, "CSIPTO Impact on APN-AMBR Agenda Item: 8.4 FS_CSIPTO: Co-ordinated P-GW change for CSIPTO (SP 130417)", S1-140277, 3GPP TSG-SA WG1 Meeting #65, Taipei, Taiwan, Jan. 20-Jan. 24, 2014. 1 pg.

U.S. Office Action for U.S. Appl. No. 15/525,868 dated Dec. 14, 2017.

Samdanis et al., IEEE Communication Surveys & Tutorials, vol. 14, No. 3, Third Quarter 2012, "Traffic Offload Enhancements for eUTRAN", pp. 884-896.

* cited by examiner

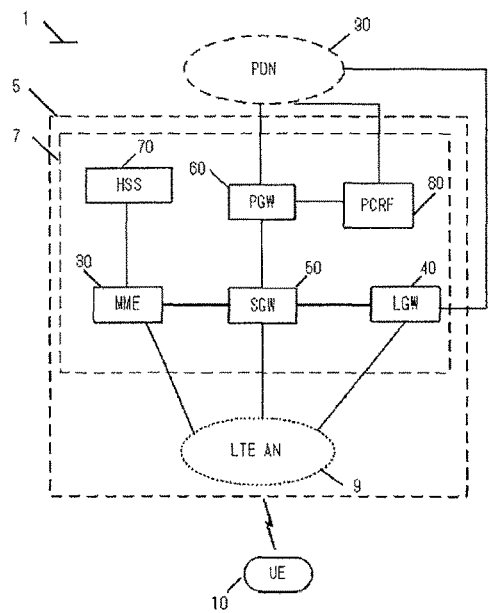
FIG. 1A
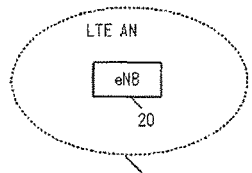
FIG. 1B
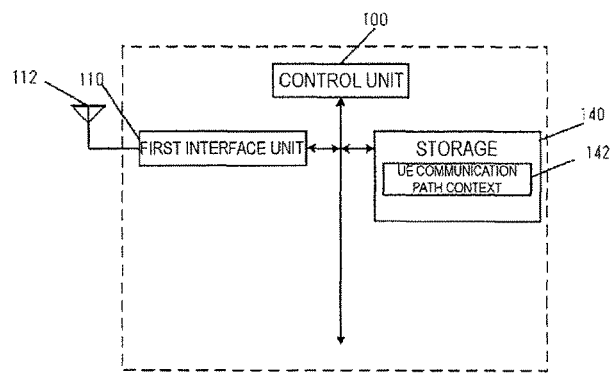
FIG. 2
INFORMATION ELEMENT MANAGED FOR EACH EFFECTIVE PDN CONNECTION
| APN | APN5 |
|---|---|
| ALLOCATED PDN TYPE | PDN TYPE 1 |
| IP ADDRESS | IP ADDRESS 1, IP ADDRESS 2 |
| DEFAULT BEARER | EPS BEARER ID 1 |
INFORMATION ELEMENT MANAGED FOR EACH EPS BEARER IN PDN CONNECTION
| EPS BEARER ID | EPS BEARER ID 5 |
|---|---|
| EPS BEARER QoS | EPS BEARER QoS 1 |
FIG. 3

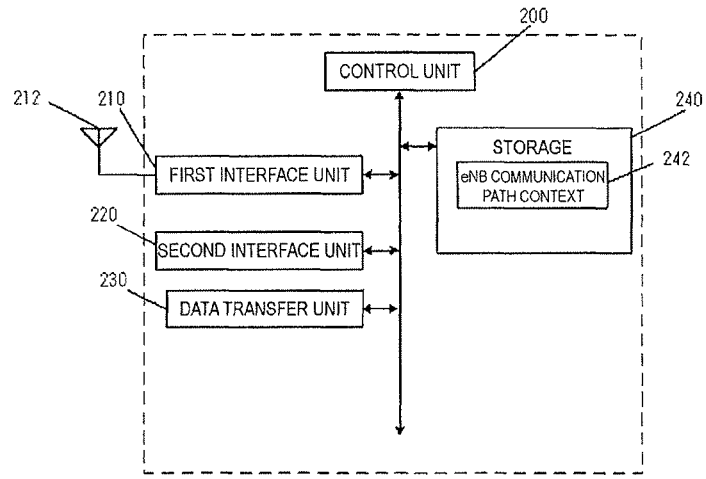

FIG. 4

INFORMATION ELEMENTS MANAGED FOR EACH PDN CONNECTION

| MME UE S1 AP ID | MME UE S1 AP ID 1 |
|---|---|
| GUMMEI | GUMMEI 1 |
| GLOBAL eNB ID | GLOBAL eNB ID 1 |
| TRACKING AREA ID | TRACKING AREA ID 1 |
| E-RAB ID | E-RAB ID 1 |
| UE ID | UE ID 1 |

INFORMATION ELEMENT MANAGED FOR EACH EPS BEARER IN PDN CONNECTION

FIRST EPS BEARER

| EPS BEARER ID | EPS BEARER ID 1 |
|---|---|
| EPS BEARER QoS | EPS BEARER QoS 1 |
| TRANSPORT ADDRESS | TRANSPORT ADDRESS 1 |

SECOND EPS BEARER

| EPS BEARER ID | EPS BEARER ID 2 |
|---|---|
| EPS BEARER QoS | EPS BEARER QoS 2 |
| TRANSPORT ADDRESS | TRANSPORT ADDRESS 2 |

FIG. 5

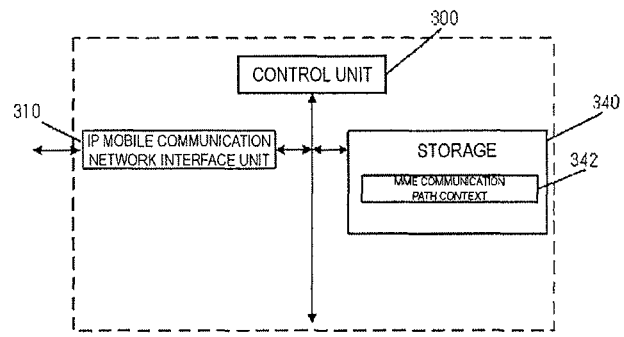

FIG. 6

INFORMATION ELEMENT MANAGED FOR EACH EFFECTIVE PDN CONNECTION

| APN | APN5 |
|---|---|
| PDN TYPE | PDN TYPE 1 |
| IP ADDRESS | IP ADDRESS 1, IP ADDRESS 2 |
| PERMISSION OF SIPTO | PERMIT CSIPTO |
| LHN ID | LHN ID 1 |
| PDN GW ADRESS (C-PLANE) | LGW ADRESS 1 |
| | PGW ADDRESS 1 |
| PDN GW TEID (C-PLANE) | CORRELATION ID 1 |
| | PGW TEID 1 |
| DEFAULT BEARER | EPS BEARER ID 1 |

INFORMATION ELEMENT MANAGED FOR EACH EPS BEARER IN PDN CONNECTION

FIRST EPS BEARER

| EPS BEARER ID | EPS BEARER ID 5 |
|---|---|
| SGW IP ADDRESS (S1-u) | |
| SGW TEID (S1-u) | |
| PGW IP ADDRESS (U-PLANE) | LGW IP ADRESS 1 |
| PGW TEID (U-PLANE) | CORRELATION ID 1 |
| EPS BEARER QoS | EPS BEARER QoS 1 |

SECOND EPS BEARER

| EPS BEARER ID | EPS BEARER ID 7 |
|---|---|
| SGW IP ADDRESS (S1-u) | SGW IP ADDRESS 1 |
| PGW TEID (S1-u) | SGW TEID1 |
| PGW IP ADDRESS (U-PLANE) | PGW IP ADDRESS 1 |
| PGW TEID (U-PLANE) | PGW TEID 1 |
| EPS BEARER QoS | EPS BEARER QoS 2 |

FIG. 7

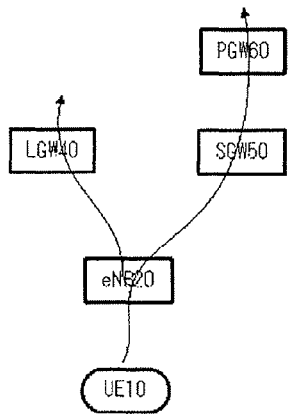

FIG. 8

TERMINAL DEVICE, BASE STATION DEVICE, MME, AND COMMUNICATION CONTROL METHOD

This application is a continuation of application Ser. No. 15/525,868, filed on May 10, 2017, which is a National Phase of PCT International Application No. PCT/JP2015/018456 filed on Nov. 9, 2015 and claims priority to Japanese Patent Application No. 2014-228505 filed in Japan on Nov. 11, 2014. The entire contents of all of the above applications are hereby expressly incorporated by reference into the present application.

TECHNICAL FIELD

The present invention relates to a terminal device, a base station device, an MME, and a communication control method.

BACKGROUND ART

The 3rd Generation Partnership Project (3GPP), which is a group for standardizing mobile communication systems, is advancing the process of formulating specifications for the Evolved Packet System (EPS), which is described in NPL 1 below, as a next-generation mobile communication system.

The following NPL 2 discloses a method for realizing the Selected IP Traffic Offload (SIPTO). SIPTO is a function that provides an offload communication path through which User Equipment (UE, terminal device) connects to an eNodeB (eNB, base station device) without the use of the core network of a mobile communication system. In this configuration, the UE establishes an offload communication path for SIPTO with a gateway device that is close in location to the UE.

3GPP has been discussing that with a Local GW (LGW) set as a gateway device used for an offload communication path for SIPTO, UE connecting to an eNB establishes a PDN connection for SIPTO with the LGW, and transmits and receives, via a broadband network, data to and from a device in the network using the PDN connection for SIPTO. At the time of establishing the PDN connection for SIPTO, the UE can establish a communication path with an LGW that is close in location to the UE, which enables communication using an optimal offload communication path.

The UE can continue to communicate while changing eNBs while moving. In this case, the UE maintains the PDN connection for SIPTO established with the LGW and can continue offload communication using the PDN connection.

However, it is assumed that multiple LGWs are provided in a communication system. Therefore, as the UE moves, an LGW closer in location to the UE than an LGW selected at the time of establishing the PDN connection for SIPTO may be present.

An offload communication path provides greater offload effect as the offload is realized by the use of a gateway that is closer in location to the UE. Hence, the PDN connection for SIPTO established by the UE may no longer be an optimal communication path as a result of the moving of the UE.

In light of such circumstances, as in NPL 3, 3GPP, which standardizes mobile communication systems, has set, as a requirement, that communication is continued by switching an already-established PDN connection to a new PDN connection using a more optimal gateway device.

CITATION LIST

Non Patent Literature

NPL 1: 3GPP TS 23.401 General Packet Radio Service (GPRS) enhancements for Evolved Universal Terrestrial Radio Access Network (E-UTRAN) access
NPL 2: 3GPP TR 23.829 Local IP Access and Selected IP Traffic Offload
NPL 3: 3GPP TR 22.828 Study on Co-ordinated P-GW change for SIPTO

SUMMARY OF INVENTION

Technical Problem

However, currently, no concrete means for continuing communication by switching an already-established PDN connection to a new PDN connection using a more optimal gateway device has been introduced.

In addition, it is required that the method for switching a communication path have high seamlessness to minimize disconnection of the communication.

In light of such circumstances, an object of the present invention is to provide a communication system and the like intended to provide optimal communication control for continuing communication of UE by switching an already-established PDN connection to a new PDN connection using a more optimal gateway.

Solution to Problem

In order to accomplish the object described above, the present invention is contrived to provide the following means.

A terminal device is configured to: establish a first Packet Data Network (PDN) connection with a first gateway device, the first PDN connection being capable of changing a communication path thereof from a communication path to the first gateway device to a communication path to a second gateway device; initiate a service request procedure by transmitting a SERVICE REQUEST message to a base station device to make a transition from an idle state to an active state; change the communication path of the first PDN connection from the first gateway device to the second gateway device in accordance with the service request procedure; and perform communication using the first PDN connection.

The terminal device is configured to transmit a first Access Point Name (APN) to a core network to establish the first PDN connection. The first APN is associated with permission information allowing a change of the communication path of the first PDN connection from the first gateway device to the second gateway device.

The terminal device is configured to transmit and receive, using a first IP address, user data through the first PDN connection; receive a second IP address from the core network in accordance with the service procedure; change the first IP address to the second IP address; and transmit and receive, using the second IP address, user data through the first PDN connection.

The terminal device is configured to: transmit a second APN to the core network to establish a second PDN connection with the first gateway device, the second APN being different from the first APN and not associated with the permission information allowing a change of a communication path of the second PDN connection from the first gateway device to the second gateway device; initiate the service request procedure by transmitting the SERVICE REQUEST message to the base station device to make a transition from the idle state to the active state; receive a SERVICE REJECT message that is a response to the SERVICE REQUEST message and rejects the service request; and transmit the second APN to the core network to establish a third PDN connection with the second gateway device in response to the reception of the SERVICE REJECT message.

The first gateway device is a Local Gateway (LGW) located for offloading, and the second gateway device is a Packet Data Gateway (PGW) located in the core network.

A Mobility Management Entity (MME) is configured to: receive, from a base station device, a SERVICE REQUEST message transmitted by a terminal device to make a transition from an idle state to an active state, and in a case that the terminal device has established at least a first PDN connection, initiate a control procedure to change a communication path of the first PDN connection from the first gateway device to a second gateway device in accordance with the service request procedure, the first PDN connection being capable of changing the communication path thereof from the communication path to the first gateway device to the communication path to the second gateway device.

The first PDN connection is established using a first Access Point Name (APN), and the first APN is associated with permission information allowing a change of the communication path of the first PDN connection from the first gateway device to the second gateway device.

The MME is configured to: in a case that the terminal device has established at least a second PDN connection, transmit a SERVICE REJECT message in response to the reception of the SERVICE REQUEST message, the SERVICE REJECT message being a response to the SERVICE REQUEST message and rejecting the service request; and request the terminal device to initiate an attach procedure by transmitting the SERVICE REJECT message. The second PDN connection is established using the second APN, and the second APN is different from the first APN and not associated with the permission information allowing a change of a communication path of the PDN connection from the first gateway device to the second gateway device.

The first gateway device is a Local Gateway (LGW) located for offloading, and the second gateway device is a Packet Data Gateway (PGW) located in the core network.

A base station device is configured to: receive, from a terminal device, a SERVICE REQUEST message transmitted to make a transition from an idle state to an active state; transmit the SERVICE REQUEST message to a core network; receive an IP address to be allocated to the terminal device from the core network; and notify the terminal device of the IP address.

A base station device is configured to: receive, from a terminal device, a SERVICE REQUEST message transmitted to make a transition from an idle state to an active state; transmit the SERVICE REQUEST message to the core network; receive first identification information from the core network, the first identification information indicating that the terminal device needs to obtain an IP address again; and notify the terminal device of the first identification information.

A communication control method for a terminal device includes the steps of: establishing a first Packet Data Network (PDN) connection with a first gateway device, the first PDN connection being capable of changing a communication path of the first PDN connection from a communication path to the first gateway device to a communication path to a second gateway device; initiating a service request procedure by transmitting a SERVICE REQUEST message to a base station device to make a transition from an idle state to an active state; changing the communication path of the first PDN connection from the first gateway device to the second gateway device in accordance with the service request procedure; and performing communication using the first PDN connection.

The communication control method further includes the step of transmitting a first Access Point Name (APN) to a core network to establish the first PDN connection. The first APN is associated with permission information allowing a change of the communication path of the first PDN connection from the first gateway device to the second gateway device.

The communication control method further includes the step of: transmitting and receiving, using a first IP address, user data through the first PDN connection; receiving a second IP address from the core network in accordance with the service procedure; changing the first IP address to the second IP address; and transmitting and receiving, using the second IP address, the user data through the first PDN connection.

The communication control method further includes the step of: transmitting a second APN to the core network to establish a second PDN connection with the first gateway device, the second APN being different from the first APN and not associated with the permission information allowing a change of a communication path of the PDN connection from the first gateway device to the second gateway device; initiate the service request procedure by transmitting a SERVICE REQUEST message to the base station device to make a transition from the idle state to the active state; receiving a SERVICE REJECT message that is a response to the SERVICE REQUEST message and rejects the service request; and transmitting the second APN to the core network to establish a third PDN connection with the second gateway device in response to the reception of the SERVICE REJECT message.

The first gateway device is a Local Gateway (LGW) located for offloading, and the second gateway device is a packet data gateway (PGW) located in the core network.

A communication control method for a mobility management entity (MME) includes the steps of: receiving, from a base station device, a SERVICE REQUEST message transmitted by a terminal device to make a transition from an idle state to an active state; and in a case that the terminal device has established at least a first PDN connection, initiating a control procedure to change a communication path of the first PDN connection from a first gateway device to a second gateway device in accordance with the service request procedure. The first PDN connection is capable of changing the communication path thereof from the communication path to the first gateway device to the communication path to the second gateway device.

The first PDN connection is established using a first Access Point Name (APN), and the first APN is associated with permission information allowing a change of the communication path of the first PDN connection from the first gateway device to the second gateway device.

The communication control method further includes the steps of: in a case that the terminal device has established at least a second PDN connection, transmitting a SERVICE REJECT message in response to the reception of the SERVICE REQUEST message, the SERVICE REJECT message being a response to the SERVICE REQUEST message and rejecting the service request; and requesting the terminal device to initiate an attach procedure by transmitting the SERVICE REJECT message. The second PDN connection is established using the second APN, and the second APN is different from the first APN and not associated with the permission information allowing a change of a communication path of the PDN connection from the first gateway device to the second gateway device.

The first gateway device is a Local Gateway (LGW) located for offloading, and the second gateway device is a Packet Data Gateway (PGW) located in a core network.

A communication control method for a base station device includes the steps of: receiving, from a terminal device, a SERVICE REQUEST message transmitted to make a transition from an idle state to an active state; transmitting the SERVICE REQUEST message to a core network; receiving an IP address to be allocated to the terminal device from the core network; and notifying the terminal device of the IP address.

A communication control method for a base station device includes the steps of: receiving, from a terminal device, a SERVICE REQUEST message transmitted to making a transition from an idle state to an active state; transmitting the SERVICE REQUEST message to the core network; receiving first identification information from the core network, the first identification information indicating that the terminal device needs to obtain an IP address again; and notifying the terminal device of the first identification information.

Advantageous Effects of Invention

According to the present invention, UE can continue to communicate by switching an already-established PDN connection using a gateway to a new PDN connection using a more optimal gateway.

BRIEF DESCRIPTION OF DRAWINGS

FIGS. 1A and 1B are diagrams illustrating an overview of a mobile communication system 1 according to a first embodiment.

FIG. 2 is a diagram illustrating a functional configuration of UE according to the embodiment.

FIG. 3 is a diagram illustrating a storage of the UE according to the embodiment.

FIG. 4 is a diagram illustrating a functional configuration of an eNB according to the embodiment.

FIG. 5 is a diagram illustrating a storage of the eNB according to the embodiment.

FIG. 6 is a diagram illustrating a functional configuration of an MME according to the embodiment.

FIG. 7 is a diagram illustrating a storage of the MME according to the embodiment.

FIG. 8 is a diagram illustrating a PDN connection to be established.

DESCRIPTION OF EMBODIMENTS

Figure 9:
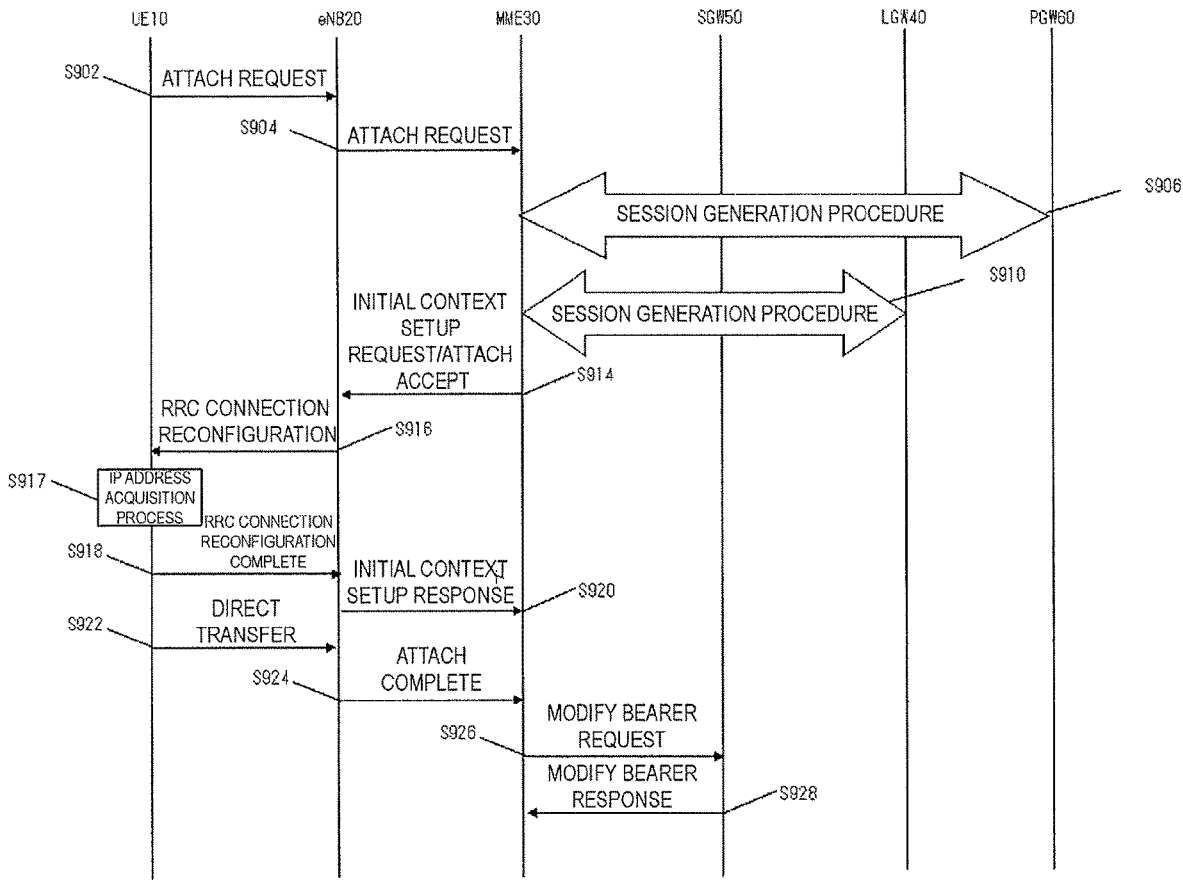
FIG. 9 is a diagram illustrating an attach procedure according to the embodiment.

Hereinafter, embodiments for carrying out the present invention will be described with reference to the drawings. Note that for the present embodiment, an embodiment of a mobile communication system to which the present invention is applied will be described in detail as an example, with reference to the drawings.

1. First Embodiment

A first embodiment to which the present invention has been applied will be described with reference to the drawings.

1.1 Overview of Mobile Communication System

FIGS. 1A and 1B are diagrams illustrating an overview of a mobile communication system 1 according to the present embodiment. As illustrated in FIG. 1A, the mobile communication system 1 is constituted of UE (terminal device) 10 and a Packet Data Network (PDN) 90. The UE 10 and the PDN 90 connect to each other via an IP mobile communication network 5. The UE 10 connects to the IP mobile communication network 5, and the IP mobile communication network 5 is connected with the PDN 90.

The IP mobile communication network 5 may be a network constituted of a radio access network and a core network managed by a mobile network operator, or may be a broadband network managed by a fixed network operator, for example. Here, the broadband network may be an IP communication network that is managed by a network operator and provides high-speed communication using a digital line such as optical fiber using asymmetric digital subscriber line (ADSL) or the like. Alternatively, the broadband network may be, without being limited to such a network, a network for radio access using worldwide interoperability for microwave access (WiMAX) or the like.

The UE 10 is a communication terminal that establishes a connection using an access system, such as long term evolution (LTE) or a wireless LAN (WLAN). The UE 10 includes a 3GPP LTE communication interface, a WLAN communication interface, or the like and is capable of establishing a connection to an IP access network using such an interface.

Specifically, the UE 10 is a mobile phone terminal or a smartphone, or a tablet computer, a personal computer, or a home appliance with a communication function.

The PDN 90 is a network that provides network services for transmitting and receiving data in the form of packets. Examples of the PDN 90 include the Internet and an IP multimedia subsystem (IMS). The PDN 90 may be a network that provides group communication services, such as a group call.

The UE 10 connects to the IP mobile communication network to establish a communication path, thereby establishing connectivity with the PDN 90. This configuration allows the UE 10 to transmit and receive data to and from the PDN 90.

The PDN 90 is connected to an IP access network using a wired line or the like. For example, the PDN 90 is constructed by ADSL, optical fiber, or the like. However, the PDN 90 maybe, without being limited to such a configuration, a radio access network such as LTE, WLAN, or WiMAX.

1.1.1 Configuration Example of IP Mobile Communication Network

As illustrated in FIGS. 1A and 1B, the mobile communication system 1 is constituted of the UE 10, the IP mobile communication network 5, and the PDN 90.

The IP mobile communication network 5 is constituted of a core network 7 and a radio access network.

The core network 7 is constituted of a mobile management entity (MME) 30, a Local Gateway (LGW) 40, a serving gateway (SGW) 50, an access control device (PGW) 60, a home subscriber server (HSS) 70, and a policy and charging rules function (PCRF) 80.

In the core network 7, multiple MMEs 30, such as an MME 30A and an MME 30B, may be provided.

In the core network 7, multiple SGWs 50, such as an SGW 50A and an SGW 50B, may be provided.

In the core network 7, multiple PGWs 60, such as a PGW 60A and a PGW 60B, may be provided.

In the core network 7, multiple LGWs 40, such as an LGW 40A and an LGW 40B, may be provided. Furthermore, the LGW 40 may be provided within the core network or may be provided within the radio access network 9.

Figure 16A:
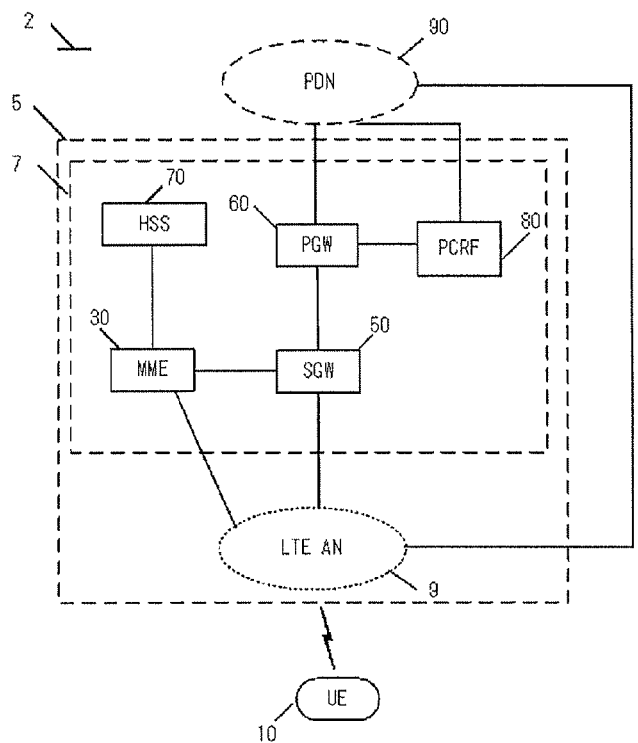
FIGS. 16A, 16B, and 16C are diagrams illustrating an overview of a mobile communication system 2.
Figure 16B:
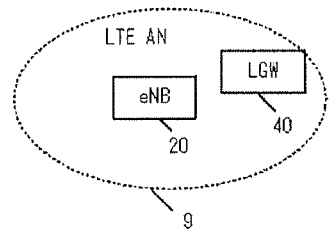
Figure 16C:
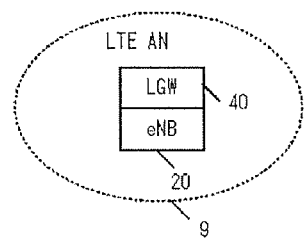

Note that although the LGW 40 is provided in the core network 7 in FIG. 1A, the LGW 40 may be a gateway device provided near the LTE_AN 9 and connecting the LTE_AN 9 to the Internet or a broadband network, as illustrated in FIGS. 16A, 16B, and 16C. The MME 30 may select, depending on a base station device to which the UE 10 connects, an LGW 40 provided near the base station device, as the endpoint node of the PDN connection established by the UE 10.

Here, as illustrated in FIG. 16C, the LGW 40 may be integral with an eNB 20. Alternatively, as illustrated in FIG. 16B, the LGW 40 may be separate from the eNB 20.

When no LGW is provided near the base station device, the MME 30 may select the PGW 60 as a gateway device that serves as the endpoint node of the PDN connection established by the UE 10.

Note that such gateway selection performed by the MME 30 may be performed in accordance with APN permission information transmitted by the UE 10 to establish a PDN connection.

Here, the APN is identification information for selecting a PDN to be connected by the UE 10. Note that multiple PDNs may be provided. For example, multiple PDNs may be provided for respective services, such as the Internet and a voice call service network (IMS network). Moreover, the UE 10 may store multiple APNs. When the UE 10 notifies the core network of the APN, the MME 30 selects the PDN corresponding to the APN and selects a gateway device used for connecting to the PDN.

As described above, the APN is identification information for selecting a PDN to be connected by the UE 10, and may be identification information for selecting a gateway device to be used for connecting to the PDN.

The MME 30 also gives approval to the connection to the PDN and the establishment of the PDN connection in accordance with the APN transmitted to the UE 10. Hence, the APN is identification information that also serves as authentication information for the UE 10 to connect to the PDN or to establish the PDN connection.

The radio access network 9 is connected to the core network 7. Furthermore, the UE 10 can wirelessly connect to the radio access network.

The radio access network may be constituted of an LTE access network 9 (LTE AN) capable of establishing a connection using an LTE access system.

The LTE AN 9 is a network including a base station device using the LTE access system. The LTE AN 9 may be a public access network or a home network established at home.

Note that each of the devices has a similar configuration to those of existing devices in a mobile communication system using an EPS, which eliminates the need for detailed description thereof. To describe the functions briefly, the PGW 60 is connected to the PDN 90, the SGW 50, and the PCRF 80 and routes user data by functioning as a gateway device between the PDN 90 and the core network 7.

The SGW 50 is connected to the PGW 60, the MME 30, and the LTE AN 9. The SGW 50 serving as a gateway device between the core network 7 and the LTE AN 9 routes user data.

The PGW 60 serving as a gateway device connecting the core network 7 and the PDN 90 routes user data. Note that the PGW 60 establishes a PDN connection with the UE 10 and enables data transmission and reception between the UE 10 and a communication device provided in the PDN 60, using the PDN connection.

The LGW 40 is connected to the SGW 50, the LTE AN 9, and the PDN 90. The LGW 40 serving as a gateway device for the PDN 90 routes user data. The LGW 40 may be connected to a broadband network and connected to the PDN 90 via the broadband network. As described above, the LGW 40 is a gateway device for establishing a communication path for offloading with the UE 10. In other words, the LGW 40 is an endpoint node of the PDN connection for SIPTO established by the UE 10 and is a device that performs offloading to the broadband network and the PDN 90.

The MME 30 is connected to the SGW 50, the LTE AN 9, and the LGW 40 and is a control device that performs location management and access control of the UE 10 via the LTE AN 9.

The HSS 70 is connected to the SGW 50 and an AAA 55 and manages subscriber information.

The PCRF 80 is connected to the PGW 60 and manages QoS management for data routing.

In addition, as illustrated in FIG. 1B, the radio access network includes devices such as a base station device to which the UE 10 actually connects, and the like. Although various devices adapted to the radio access network are conceivable as the devices used for the connections, the LTE AN 9 is configured to include the eNB 20 in the present embodiment. The eNB 20 is a radio base station to which the UE 10 connects using an LTE access system. The LTE AN 9 may be configured to include one or multiple radio base stations.

Note that, herein, the UE 10 being connected to a radio access network refers to the UE 10 being connected to a base station device included in the radio access network, and data, signals, and the like are also transmitted and received through the base station device.

For example, the UE 10 being connected to the LTE AN 9 refers to the UE 10 being connected via the eNB 20.

1.2 Device Configuration

Next, the configuration of each of the devices will be described briefly with reference to the drawings.

1.2.1 Configuration of UE

A functional configuration of the UE 10 according to the present embodiment will be described with reference to FIG.

2. In the UE 10, a first interface unit 110 and a storage 140 are connected to a control unit 100 via a bus.

The control unit 100 is a function unit for controlling the UE 10. The control unit 100 implements various processes by reading out various kinds of information and various programs stored in the storage 140 and executing the programs.

The first interface unit 110 is a function unit for establishing a connection to the LTE AN 9 in compliance with an LTE access scheme and transmitting and receiving data using radio communication. An external antenna 112 for transmitting and receiving data in compliance with the LTE access scheme is connected to the first interface unit 110.

The storage 140 is a function unit for storing programs, data, and the like necessary for various operations of the UE 10. The storage 140 is constituted of, for example, a semiconductor memory, a hard disk drive (HDD), or the like. Furthermore, the storage 140 stores an APN list and UE communication path context 142.

The APN list stores APNs that the UE 10 can use. The UE 10 may store multiple APNs in the APN list.

The access point name (APN) is identification information used by the MME 30 to select a gateway device that serves as an endpoint node of the PDN connection to be established by the UE 10 over the IP mobile communication network 5. The APN may be identification information associated with the PDN 90. When a different PDN 90 is configured for each of the services, such as IMS and video streaming, the APN can also be used as identification information identifying the corresponding service. Note that an APN capable of establishing a PDN connection for SIPTO and an APN that does not perform offload communication may be managed as different APNs. In this case, a gateway selected in accordance with an APN for offloading may be the LGW 40, while a gateway selected in accordance with an APN that does not perform offload communication may be the PGW 60 configured in the core network 7.

Each of the APNs may be associated with permission information allowing a switch to a PDN connection using a different gateway as an endpoint node.

For example, APN1 may be an APN capable of establishing a PDN connection for SIPTO as well as an APN that is not allowed to switch to a PDN connection using a different gateway as an endpoint node. APN2 may be an APN that is capable of establishing a PDN connection for SIPTO and is allowed to switch to a PDN connection using a different gateway as an endpoint node. APN3 may be an APN that is unable to establish a PDN connection for SIPTO and is not allowed to switch to a PDN connection using a different gateway as an endpoint node. APN4 may be an APN that is unable to establish a PDN connection for SIPTO and is allowed to switch to a PDN connection using a different gateway as an endpoint node. APN5 may be an APN that capable of establishing a PDN connection for SIPTO and is allowed to have multiple connectivity using different gateways as endpoint nodes. APN5 may be an APN capable of simultaneously establishing multiple bearers using different gateways as endpoint nodes using a single PDN connection.

The UE communication path context 142 is a group of information pieces stored in association with a communication path established by the UE. In the UE communication path context 142, a communication path context is stored for each PDN connection. A concrete example of the UE communication path context 142 is illustrated in FIG. 3.

FIG. 3 illustrates an example of each of information elements managed by the UE 10 for the PDN connection established using APN5.

As illustrated in FIG. 3, when having established a PDN connection, the UE 10 manages the APN used for establishing the PDN connection, the allocated PDN type, the IP address, and the default bearer, as information elements managed for each effective PDN connection. In addition, when having established the PDN connection, the UE 10 manages an EPS bearer ID and an EPS bearer QoS as information elements managed for each EPS bearer in the PDN connection.

Note that the UE 10 may hold multiple APNs and establish a PDN connection corresponding to each of the APNs. Furthermore, the information elements managed for each PDN connection may be stored for each of the PDN connections established with each of the APNs. Each of the information elements may be different among PDN connections. This configuration allows the UE 10 to establish multiple PDN connections.

For example, the UE 10 may establish a PDN connection for offloading using APN1, a PDN connection for communication via the core network 7 using APN3, and a PDN connection capable of offloading and having multiple connectivity to different gateways. Note that APN3 may be an APN that is not allowed to select the LGW 40 as an endpoint node of a PDN connection and that is not allowed to establish an offload communication path. In this case, the UE 10 establishes a PDN connection with the PGW 60 using APN3 to connect to the PDN.

Note that the establishment of a PDN connection using an APN may correspond to the establishment of a PDN connection in accordance with an attach request including at least an APN transmitted by the UE 10 to the MME 30. Note that the UE 10 may transmit the APN to the MME 30, with the APN included in an ATTACH REQUEST message for initiating an attach procedure or may transmit the APN to the MME, with the APN included in another control message in the attach procedure.

Alternatively, the establishment of a PDN connection using an APN may correspond to the establishment of a PDN connection in accordance with a PDN connectivity request including at least an APN transmitted by the UE 10 to the MME 30. Note that the UE 10 may transmit the APN to the MME 30, with the APN included in a PDN CONNECTIVITY REQUEST message for initiating a PDN connectivity procedure or may transmit the APN to the MME, with the APN included in another control message in the PDN connectivity procedure.

The allocated PDN type is information indicating the version of an IP address allocated to the UE 10. The version of the IP address is either IPv4 or IPv6. Here, the UE 10 is notified of the allocated PDN type together with the IP address in an attach accept and manages the notified PDN type as the allocated PDN type.

Here, the UE 10 can request the version of IP address to be allocated, by including the PDN type, which is information indicating the version of IP address, in the attach request.

The UE 10 is notified of the allocated PDN type together with the IP address in a PDN connectivity accept and manages the notified PDN type as the allocated PDN type.

Here, the UE 10 can request the version of an IP address to be allocated, by including the PDN type, which is information indicating the version of the IP address, in the PDN connectivity request.

The IP address is an IP address allocated to the UE 10. The UE 10 transmits uplink data and receives downlink data using the allocated IP address. Note that a single or multiple IP addresses may be managed for each effective PDN connection. Multiple IP addresses may be managed when a PDN connection with multiple connectivity to different gateways is established. However, when a PDN connection with multiple connectivity to different gateways is established but the same IP address can be used for the different gateways, a single IP address may be managed.

The default bearer is information identifying a radio bearer that is a radio communication path established between the UE 10 and the eNB 20 when the UE 10 connects to the eNB 20 in the LTE AN 9.

The default bearer may be an EPS bearer ID, a radio bearer ID, or a linked bearer ID (LBI). Note that the LBI is information associated with a bearer ID.

The UE 10 may manage the APN, the allocated PDN type, the IP address, and the default bearer in association with each other as information elements managed for each effective PDN connection.

The EPS bearer ID is information identifying a radio bearer that is a radio communication path established between the UE 10 and the eNB 20 when the UE 10 connects to the eNB 20 in the LTE AN 9.

The EPS bearer ID may be a radio bearer ID or a linked bearer ID (LBI). Note that the LBI is information associated with a bearer ID.

The UE 10 may manage, as the default bearer, a bearer ID of a bearer allocated when connecting to the PDN for the first time, and may manage, as the EPS bearer ID, a bearer ID when a different bearer is allocated in the same PDN connection.

The EPS bearer QoS is information indicating the quality of service (QoS) associated along with the EPS bearer ID. The EPS bearer QoS is not associated with the default bearer and is information indicating the QoS when an EPS bearer different from the default bearer is allocated in the PDN connection.

The UE 10 may manage the EPS bearer ID and the EPS bearer QoS in association with each other as information elements managed for each EPS bearer in the PDN connection.

The UE 10 may manage the information elements managed for each effective PDN connection and the information elements managed for each EPS bearer in the PDN connection in association with each other. In other words, the UE 10 may manage the APN, the allocated PDN type, the IP address, the default bearer, the EPS bearer ID, and the EPS bearer QoS in association with each other.

Note that the UE 10 may establish multiple communication paths. Specifically, the UE 10 may create and manage the UE communication path context 142 for each established PDN connection.

The UE 10 may manage base station identification information and service identification information, in addition to the above-described information.

The base station identification information may be information identifying the eNB 20. The base station identification information may be constituted of a combination of an operator identification code identifying the mobile network operator providing the communication service and the base station identification code. This configuration allows the base station identification information to be unique identification information in multiple mobile communication networks provided by multiple mobile network operators.

The service identification information is information identifying a service provided in the IP communication network 5 by a mobile network operator. The service identification information may be an APN or may be service domain identification information, such as a fully qualified domain name (FQDN). The service identification information may be, without being limited to such information, any identification information associated with the service. Furthermore, the service may include a voice call service or video streaming service based on IMS, and a service providing group communication. The service identification information is identification information identifying such a service.

1.2.2 Configuration of eNB

With reference to FIG. 4, a functional configuration of the eNB 20 according to the present embodiment will be illustrated. In the eNB 20, a first interface unit 210, a second interface unit 220, a data transfer unit 230, and a storage 240 are connected to a control unit 200 via a bus.

The control unit 200 is a function unit for controlling the eNB 20. The control unit 200 implements various processes by reading out various kinds of information and various programs stored in the storage 240 and executing the programs.

The first interface unit 210 is a function unit for establishing a radio communication path with the UE 10 in compliance with an LTE access scheme and transmitting and receiving data using radio communication. An external antenna 212 is connected to the first interface unit 210.

The second interface unit 220 is connected to the core network 7 to the core network through wired connection. The connection to the core network 7 may be established over Ethernet (registered trademark), an optical fiber cable, or the like.

The storage 240 is a function unit for storing programs, data, and the like necessary for various operations of the eNB 20. The storage 240 is constituted of, for example, a semiconductor memory, a hard disk drive (HDD), or the like. Furthermore, the storage 240 stores an eNB communication path context 242.

The eNB communication path context 242 is a group of information pieces stored in association with a communication path established by the eNB 20. FIG. 5 illustrates a concrete example of the eNB communication path context 242. FIG. 5 illustrates information elements managed by the eNB 20 when a PDN connection has been established using APN5.

As illustrated in FIG. 5, the eNB 20 manages an MME UE S1 AP ID, a GUMMEI, a global eNB ID, a tracking area ID, an E-RAB ID, and a UE ID, as information elements managed for each effective PDN connection.

When having established a PDN connection, the eNB 20 manages an EPS bearer ID, an EPS bearer QoS, and a transport address as information elements managed for each EPS bearer in the PDN connection.

Note that the eNB 20 may manage multiple EPS bearers for a single PDN connection. When the eNB 20 manages multiple EPS bearers for a single PDN connection, the eNB 20 may manage the EPS bearer ID, the EPS bearer QoS, and the transport address for each EPS bearer.

The MME UE S1 AP ID is identification information allocated for identifying the UE on the S1 interface. Note that the eNB 20 may receive the MME UE S1 AP ID from the MME 30 and manage the MME UE S1 AP ID. The eNB 20 may receive the MME UE S1 AP ID from the MME 30 by S1-AP signalling.

The GUMMEI is the identification number of the MME 30. The eNB 20 can transfer a message from the UE 10 to the MME 30 with the GUMMEI. Note that MME identification information to be used for selecting an MME when the eNB 20 selects a destination of the control message may be an MMEI (MME ID) instead of the GUMMEI.

The global eNB ID is identification information identifying the eNB 20. The global eNB ID may be constituted of a combination of an operator identification code identifying the mobile network operator providing the communication service and the base station identification code. This configuration allows the global eNB ID to be unique identification information in multiple mobile communication networks provided by multiple mobile network operators.

The tracking area ID is identification information identifying the tracking area to which the eNB 20 belongs. The tracking area is information indicating the location of the eNB 20.

The E-UTRAN radio access bearer ID (E-RAB ID) is identification information identifying the radio access bearer in the E-UTRAN. When establishing a radio connection with the UE 10, the eNB 20 allocates the E-RAB ID to the UE 10. Note that the E-RAB ID may be a radio bearer ID, an EPS bearer ID, or a default bearer.

The UE ID is identification information identifying a UE. The eNB 20 manages the identification information on the UE 10 that has established a radio connection with the UE 10. Note that a concrete UE ID may be an international mobile subscriber identity (IMSI). Alternatively, the UE ID may be a globally unique temporary identity (GUTI). Alternatively, the UE ID may be a SAE temporary mobile subscriber identity (S-TMSI), or an IP address of the UE. At least one of these information elements may be stored. These information elements may be combined. Note that such pieces of identification information may be obtained from the core network.

The EPS bearer ID is identification information identifying an EPS bearer. Here, the EPS bearer ID may be an identifier indicating the EPS bearer between the eNB 20 and the SGW 50. The EPS bearer ID may be an identifier indicating the EPS bearer between the eNB 20 and the LGW 40.

The transport address is information indicating the transfer destination of uplink data from the UE 10. When having established a radio connection with the UE 10, the eNB 20 manages the transfer destination of the uplink data. The transport address may be the IP address of the SGW 50, the TEID of the SGW 50, the IP address of the LGW, the correlation ID or the LHN ID of the LGW 40. The tunnel endpoint ID (TEID) is identification information of a tunnel communication path for transport of user data constituting the PDN connection. The TEID may be identification information on a tunnel communication path established in accordance with a GTP protocol, a mobile IP protocol, or a proxy mobile IP protocol.

The correlation ID is identification information on the tunnel communication path in the LGW 40 corresponding to the TEID in the SGW 50. Note that the correlation ID may be a SIPTO correlation ID specifying that SIPTO is provided. Note that the invention is intended for SIPTO; thus, the correlation ID is a correlation ID providing SIPTO in the present invention unless otherwise stated.

The local HeNB network ID (LHN ID) is identification information identifying the network to which the LGW 40 belongs.

When managing the LGW 40, the eNB 20 may notify the MME 30 of the identification information on the LGW 40 in the attach procedure. When managing the LGW 40, the eNB 20 may notify the MME 30 of the identification information on the LGW 40 in the service request procedure. When managing the LGW 40, the eNB 20 may notify the MME 30 of the identification information on the LGW 40 in the PDN connectivity procedure.

The eNB communication path context 242 may be held for each communication path. For example, when multiple communication paths established with the UE 10 are present, the eNB communication path context 242 may be held for each of the communication paths.

Here, the base station information on the eNB communication path context may include information identifying the UE 10 and information identifying the eNB 20.

The data transfer unit 230 is a function unit for transferring received data received from the UE 10 via the first interface unit 210, to the IP mobile communication network via the second interface unit 220 and also transferring received data addressed to the UE 10 received via the second interface unit 220, to the UE 10 via the first interface unit 210.

Note that the eNB 20 may establish multiple bearers for a single PDN connection and store information elements corresponding to each of the bearers. The first bearer established for the single PDN connection may be a bearer for offload communication connected to the LGW configured for offload communication. A second bearer may be a bearer connected to the PGW included in the core network 7.

Note that the first bearer may be a bearer connecting the eNB 20 and the LGW 40 or may be a combination of a bearer connecting the eNB and the SGW and a bearer connecting the SGW 50 and the LGW 40.

The second bearer may be a bearer connecting the eNB 20 and the SGW 50 and a bearer combining the SGW 50 and the PGW 60.

Alternatively, the eNB 20 may manage a radio bearer between the UE 10 and the eNB 20 and/or a bearer between the eNB 20 and the SGW 50 as common bearers and may manage the first bearer as the bearer connecting the SGW 50 and the LGW 40 while managing the second bearer as the bearer connecting the SGW 50 and the PGW 60. In this way, the MME 30 may manage bearers connecting to different gateways in association with the PDN connections.

1.2.3 Configuration of MME

The MME 30 is a control device that determines whether or not to give permission regarding establishment of a communication path or provision of a service for the UE 10.

FIG. 6 illustrates a functional configuration of the MME 30. In the MME 30, the IP mobile communication network interface unit 410 and a storage 440 are connected to a control unit 400 via a bus.

The control unit 300 is a function unit for controlling the UE 10. The control unit 300 implements various processes by reading out and executing various programs stored in the storage 340.

The IP mobile communication network interface unit 310 is a function unit through which the MME 30 connects to the IP mobile communication network 5.

The storage 340 is a function unit for recording programs, data, and the like necessary for various operations of the UE 10. The storage 340 is constituted of, for example, a semiconductor memory, a hard disk drive (HDD), or the like. Furthermore, the storage 340 stores MME communication path context 342.

The MME communication path context 342 is a group of information pieces stored in association with a communication path established between the UE 10 and the PGW 60.

FIG. 7 illustrates a concrete example of the MME communication path context 342. FIG. 7 illustrates information elements managed by the MME 30 when the UE 10 has established a PDN connection using APN5.

As illustrated in FIG. 7, when the UE 10 has established a PDN connection, the MME 30 may manage an APN, a PDN type, an IP address, SIPTO permission information, a LHN ID, a PDN GW address (C-plane), a PGW TEID (C-plane), a default bearer, and the like, as information elements managed for each effective PDN connection.

When the PDN connection has been established, the MME 30 manages an EPS bearer ID, an SGW IP address (S1-u), an SGW TEID (S1-u), a PGW IP address (u-plane), a PGW TEID (u-plane), an EPS bearer QoS, and the like as information elements managed for each EPS bearer in the PDN connection.

Note that the MME 30 may manage multiple EPS bearers for a single PDN connection. When managing multiple EPS bearers for a single PDN connection, the MME 30 may manage an EPS bearer ID, an SGW IP address (S1-u), an SGW TEID (S1-u), a PGW IP address (u-plane), a PGW TEID (u-plane), and an EPS bearer QoS for each EPS bearer.

Note that the first bearer established for the single PDN connection may be a bearer for offload communication connected to the LGW configured for offload communication. The second bearer may be a bearer connected to the PGW included in the core network 7.

Note that the first bearer may be a bearer connecting the eNB 20 and the LGW 40 or may be a combination of a bearer connecting the eNB and the SGW and a bearer connecting the SGW 50 and the LGW 40.

The second bearer may be a bearer connecting the eNB 20 and the SGW 50 and a bearer combining the SGW 50 and the PGW 60.

Alternatively, the MME 30 may manage a bearer between the eNB 20 and the SGW 50 as a common bearer, manage the first bearer as a bearer connecting the SGW 50 and the LGW 40, and manage the second bearer as the bearer connecting the SGW 50 and the PGW 60.

In this way, the MME 30 may manage bearers connecting to different gateways in association with the PDN connections.

The access point name (APN) is identification information used for selection of a gateway device that serves as an endpoint node of the PDN connection established by the UE 10 in the IP mobile communication network 5. The APN may be identification information associated with the PDN 90. When a different PDN 90 is configured for each of the services, such as IMS and video streaming, the APN can also be used as identification information identifying the corresponding service. Note that an APN for offload communication that is capable of establishing a SIPTO-enabled PDN connection and an APN that does not perform offload communication may be managed as different APNs. In this case, a gateway selected in accordance with the APN for offloading may be the LGW 40, while a gateway selected in accordance with the APN that does not perform offload communication may be the PGW 60 configured in the core network 7.

Each of the APNs may be associated with permission information allowing a switch to a PDN connection using a different gateway as an endpoint node.

For example, APN1 may be an APN capable of establishing a PDN connection for SIPTO as well as APN that is not allowed to switch to a PDN connection using a different gateway as an endpoint node. APN2 may be an APN that is capable of establishing a PDN connection for SIPTO and is allowed to switch to a PDN connection using a different gateway as an endpoint node. APN3 may be an APN that is unable to establish a PDN connection for SIPTO and is not allowed to switch to a PDN connection using a different gateway as an endpoint node. APN4 may be an APN that is unable to establish a PDN connection for SIPTO and is allowed to switch to a PDN connection using a different gateway as an endpoint node. APN5 may be an APN that is capable of establishing a PDN connection for SIPTO as well as an APN that is allowed to have multiple connectivity using different gateways as endpoint nodes. APN5 may be an APN that simultaneously establishes multiple bearers using different gateways as endpoint nodes for a single PDN connection.

The MME 30 manages, for each UE, an APN available to the UE. Multiple APNs available to the UE may be provided. For example, the MME 30 may manage that the UE 10 is allowed to establish connections using APN1, APN3, APN4, and APN5.

The PDN type is information indicating the version of the IP address allocated to the UE 10. The version of the IP address is either IPv4 or IPv6. Here, the MME 30 may notify the UE 10 of the PDN type together with the IP address in an attach accept and manage the notified PDN type. The MME 30 may notify the UE 10 of the PDN type together with the IP address in a PDN connectivity accept and manage the notified PDN type.

The IP address is an IP address allocated to the UE 10. The UE 10 can transmit uplink data and receive downlink data with the allocated IP address.

The MME 30 may manage the IP address of the UE 10 in advance. The MME 30 may manage the IP address notified by the PGW 30. Further, the MME 30 may manage the IP address notified by the LGW 40.

The permission of SIPTO includes information indicating that the associated APN allows SIPTO. Here, the SIPTO permission information may be subdivided permission information. For example, the SIPTO permission information may include permission information indicating that establishment of a PDN connection for SIPTO is prohibited, permission information indicating that establishment of a PDN connection for SIPTO other than SIPTO@LN is allowed, permission information indicating that establishment of a PDN connection for SIPTO including SIPTO@LN is allowed, or permission information indicating that establishment of a PDN connection only for SIPTO@LN is allowed.

Here, SIPTO@LN may indicate that the UE 10 establishes a PDN connection with the LGW included in the access network, and SIPTO other than SIPTO@LN may indicate that the UE 10 establishes a PDN connection with the LGW included in the core network.

Note that in the present embodiment, allowing establishment of a PDN connection for SIPTO including SIPTO@LN described above is expressed as allowing SIPTO and SIPTO@LN.

The permission of SIPOTO may include, in addition to the above permission information, permission information indicating that establishment of a PDN connection for SIPTO@LN and SIPTO is possible and a switch to a PDN connection using a different gateway as an endpoint node is allowed. Further, the permission of SIPTO may include permission information indicating that establishment of a PDN connection for SIPTO is possible and having multiple connectivity using different gateways as endpoint nodes is allowed.

Note that in the present embodiment, the above-described permission information indicating that establishment of a PDN connection for SIPTO@LN and SIPTO is possible and having multiple connectivity using different gateways as endpoint nodes is allowed is indicated as permission for co-ordinated P-GW change for SIPTO (CSIPTO).

The LHN ID is identification information identifying the network that is managed by the eNB 20 and to which the LGW 40 belongs. The MME 30 may manage the LHN ID when a gateway as an endpoint node of the PDN connection established by the UE 10 is the LGW 40.

The PDN GW address (C-plane) is an IP address for transmitting and receiving control information in the PGW 60. The MME 30 manages the IP address of the LGW 40 and the IP address of the PGW 60 in the PDN GW address (C-plane). Here, the C-plane indicates control information. The PDN GW address (C-plane) is an IP address of the PGW 60 for transmitting and receiving control information. In the PGW 60, a PGW transmitting and receiving control information and a PGW transmitting and receiving user data may be integrally or separately configured.

The PDN GW TEID (C-plane) is identification information on the tunnel communication path in the PGW 60. The PDN GW TEID is identification information on a tunnel communication path established in accordance with a GTP protocol, a mobile IP protocol, or a proxy mobile IP protocol.

The PDN GW TEID (C-plane) may be a TEID of the PGW 60 for transmitting and receiving control information. In other words, in the PGW 60, the TEID of the PGW transmitting and receiving control information and the TEID of the PGW transmitting and receiving user data may be different from each other.

The PDN GW TEID (C-plane) may include a correlation ID. The correlation ID is identification information on the tunnel communication path in the LGW 40. Note that the correlation ID may be a SIPTO correlation ID specifying that SIPTO is provided.

The default bearer is information identifying a radio bearer that is a radio communication path established between the UE 10 and the eNB 20 when the UE 10 connects to the eNB 20 in the LTE AN 9.

The default bearer may be an EPS bearer ID, a radio bearer ID, or a linked bearer ID (LBI). Note that the LBI is information associated with a bearer ID.

The MME 30 may manage an APN, a PDN type, an IP address, SIPTO permission information, a LHN ID, a PDN GW address (C-plane), a PDN GW TEID (C-plane), and a default bearer in association with each other, as information elements managed for each effective PDN connection.

The EPS bearer ID may be information identifying the radio bearer that is the radio communication path established between the UE 10 and the eNB 20 when the UE 10 connects to the eNB 20 in the LTE AN 9. The EPS bearer ID may be an identifier indicating the EPS bearer between the eNB 20 and the SGW 50. The EPS bearer ID may be an identifier indicating the EPS bearer between the eNB 20 and the LGW 40.

The EPS bearer ID may be a radio bearer ID or a linked bearer ID (LBI). Note that the LBI is information associated with a bearer ID.

The MME 30 may manage, as the default bearer, the bearer ID of the bearer allocated when connecting to the PDN for the first time, and may manage, when a different bearer is allocated in the same PDN connection, the different bearer as the EPS bearer ID.

The SGW IP address (S1-u) is the IP address of the SGW 50 for transmitting and receiving user data. S1-u indicates the interface for transmitting and receiving user data between the SGW 50 and the eNB 20. Note that the SGW 50 transmits and receives user data to and from the eNB 20 but neither transmits nor receives control information to and from the eNB 20.

Note that when the SGW 50 is not included in an established PDN connection, the MME 30 does not need to manage the IP address of the SGW 50.

The SGW TEID (S1-u) is identification information on the tunnel communication path between the eNB 20 and the SGW 50 for transmitting and receiving user data. Note that the SGW 50 transmits and receives user data to and from the eNB 20 but neither transmits nor receives control information to and from the eNB 20.

The SGW TEID (S1-u) may be identification information on a tunnel communication path established in accordance with a GTP protocol, a mobile IP protocol, or a proxy mobile IP protocol. Note that when the SGW 50 is not included in an established PDN connection, the MME 30 does not need to manage the TEID of the SGW 50.

The PGW IP address (U-plane) is the IP address of the PGW 60 transmitting and receiving user data. The MME 30 manages the IP address of the LGW 40 and the IP address of the PGW 60 in the PGW IP address (U-plane). Note that, in the PGW 60, a PGW transmitting and receiving user data and a PGW transmitting and receiving control information may be integrally or separately configured.

The PGW TEID (U-plane) is identification information on the tunnel communication path in the PGW 60 transmitting and receiving user data. The PGW TEID (U-plane) is identification information on a tunnel communication path established in accordance with a GTP protocol, a mobile IP protocol, or a proxy mobile IP protocol. Note that, in the PGW 60, a PGW transmitting and receiving user data and a PGW transmitting and receiving control information may be integrally or separately configured.

Note that the PDN GW TEID (U-plane) may include a PGW TEID and a correlation ID. The correlation ID is identification information on the tunnel communication path in the LGW 40. Note that the correlation ID may be a SIPTO correlation ID specifying that SIPTO is provided.

The EPS bearer QoS is information indicating the quality of service (QoS) associated together with the EPS bearer ID. The EPS bearer QoS is not associated with the default bearer and is information indicating the QoS when an EPS bearer different from the default bearer is allocated in the PDN connection.

The MME 30 may manage an EPS bearer ID, an SGW IP address (S1-u), an SGW TEID (S1-u), a PGW IP address (U-plane), a PGW TEID (U-plane), and an EPS bearer QoS, as information elements managed for each EPS bearer in the PDN connection in association with each other.

The MME 30 may manage the information elements managed for each effective PDN connection and the information elements managed for each EPS bearer in the PDN connection in association with each other. Specifically, the MME 30 may manage an APN, a PDN type, an IP address, permission of SIPTO, a LHN ID, a PDN GW address (C-plane), a PDN GW TEID (C-plane), a default bearer, an EPS bearer ID, an SGW IP address (S1-u), an SGW TEID (S1-u), a PGW IP address (U-plane), a PGW TEID (U-plane), and an EPS bearer QoS in association with each other.

Note that the MME 30 may establish multiple communication paths. Specifically, the MME 30 may create and manage the MME communication path context 342 for each established PDN connection.

The MME 30 may manage base station identification information and service identification information, in addition to the above-described information.

The base station identification information may be information identifying the eNB 20. The base station identification information may be constituted of an operator identification code identifying the mobile network operator providing the communication service and the base station identification code. This configuration allows the base station identification information to be unique identification information in multiple mobile communication networks provided by multiple mobile network operators.

The service identification information is information identifying a service provided in the IP communication network 5 by a mobile network operator. The service identification information may be an APN or may be service domain identification information, such as a fully qualified domain name (FQDN). The service identification information may be, without being limited to such information, any identification information associated with the service. Furthermore, the service may include a voice call service or video streaming service based on IMS, and a service providing group communication. The service identification information is identification information identifying such a service.

The MME communication path context 342 may be held for each communication path. For example, when the UE 10 establishes multiple communication paths with the eNB 20, the MME communication path context 342 may be held for each of the communication paths.

1.3 Description of Processing

Next, description will be given of concrete PDN connection establishment and method of selecting a bearer in the above-described mobile communication system. With reference to FIG. 8, description will be given of a PDN connection and a bearer to be established and a method of selecting a bearer in the present embodiment.

In FIG. 8, first, the UE 10 establishes a PDN connection and performs data communication with a terminal to communicate with on the network, using the PDN connection.

Here, the PDN connection may be a PDN connection for offload communication. The established PDN connection may be constituted of a first connection established between the UE 10 and the LGW 40 and a second connection established between the UE 10 and the PGW 60 via the eNB 20. The established PDN connection may be constituted of a first bearer established between the UE 10 and the LGW 40 and a second bearer established between the UE 10 and the PGW 60 via the eNB 20.

Here, the MME 30 first requests a first optimal gateway (LGW 40) to establish a session for a single PDN connection. Here, the MME 30 may request the selected optimal gateway (LGW 40) to allocate an IP address.

Then, the MME 30 requests a second optimal gateway (PGW 60) to establish a session for the single PDN connection. Here, the MME 30 may request the selected optimal gateway (PGW 60) to allocate an IP address.

Here, when the UE 10 is located at least in the serving area of the eNB 20, the UE 10 can maintain the PDN connection including a first bearer between the eNB 20 and the LGW 40 and a second bearer between the UE 10 and the PGW 60 via the eNB 20.

Here, when the UE 10 is located at least in the serving area of the eNB 20, the UE 10 can transmit and receive data using the first bearer via the LGW 40 used as the optimal gateway.

Then, as the UE 10 moves, the UE 10 changes the serving base station. For example, the UE 10 changes the serving base station from an eNB 20A to an eNB 20B.

As the UE 10 moves, the serving base station is changed from the eNB 20A to the eNB 20B. In a conventional system, even when changing the serving base station from the eNB 20A to the eNB 20B, the UE 10 maintains the PDN connection for which the LGW 40 has been selected, unless the PDN connection is canceled and another PDN connection is reestablished. In other words, the UE 10 maintains the PDN connection to the LGW 40 via the eNB 20B. Here, when the UE 10 is located in the serving area of the eNB 20B, the LGW 40 may not necessarily be the optimal gateway for offloading, and hence the PDN connection to the LGW 40 may not be the PDN connection for which the optimal gateway has been selected.

In the present embodiment, the UE 10 does not have connectivity having a single gateway as an endpoint node in a single PDN connection as in the conventional system, but has multiple connectivity using multiple gateways as endpoint nodes in a single PDN connection. For the PDN connection established here, a bearer may be established for each of the gateways.

Specifically, the UE 10 may establish the first bearer between the UE 10 and the LGW 40 and the second bearer between the UE 10 and the PGW 60 via the eNB 20 in the single PDN connection.

Here, even when the UE 10 has moved to the eNB 20B, an optimal communication control is performed for UE communication by switching to a connection using the optimal gateway via the PGW 60, instead of using a connection via the LGW 40, which is no longer the optimal gateway, in the already-established PDN connection.

Furthermore, even when the UE 10 has moved to the eNB 20B, optimal communication control may be performed for UE communication by switching to the second bearer using the optimal gateway, instead of using the first bearer using the optimal gateway that is no longer optimal, in the already-established PDN connection.

Note that in the conventional system, when the MME 30 detects that the already-established PDN connection is not the optimal communication path, the MME 30 transmits, to the UE 10, a PDN connectivity reestablishment request for a PDN connection. Upon receiving the PDN connectivity reestablishment request from the MME 30, the UE 10 performs a PDN connectivity reestablishment procedure.

In the present embodiment, when the MME 30 detects that the connection via the LGW 40 is not the optimal communication path in the already-established PDN connection, the MME 30 selects the PGW 50 as the optimal gateway in the already-established PDN connection and performs a procedure for changing the gateway in the PDN connection, instead of requesting the UE 10 to reestablish a PDN connection.

Here, when the MME 30 detects that the communication path is not optimal in the first EPS bearer in the already-established PDN connection, the MME 30 may select the second EPS bearer in the PDN connection of the UE 10 and performs a procedure for changing the gateway in the PDN connection.

Here, the MME 30 may switch the connection from the first connection (the first bearer) using the LGW 40 as the endpoint node to the second connection (the second bearer) using the PGW 60 as the endpoint node, with a single IP address.

Here, the MME 30 may switch the connection from the first connection (the first bearer) using the LGW 40 as the endpoint node to the second connection (the second bearer) using the PGW 60 as the endpoint node, with multiple IP addresses.

The MME 30 may notify the UE 10 of the IP address received from the optimal gateway (PGW 60). The UE 10 may receive the IP address from the MME 30 and update the IP address managed for the PDN connection.

The above-described procedure makes it possible to change from the first EPS bearer in the PDN connection between the UE 10 and the LGW 40, which is no longer the optimal gateway, to the second EPS bearer in the PDN connection between the UE 10 and the PGW 60, which is the optimal gateway.

In other words, the UE 10 can switch the communication path thereof from the communication path to the LGW 40 to the communication path to the PGW 60 in the established PDN connection.

Even during a change of an EPS bearer in the core network 7, the UE 10 is able to reduce packet loss and the like and delay caused by switching of the communication path without noticing the PDN connection for which the EPS bearer is being changed, which improves seamlessness.

1.3.1 Attach Procedure

First, an attach procedure in the UE 10 will be described with reference to FIG. 9. Note that the attach procedure allows the UE 10 to establish a PDN connection using APN5. The UE 10 can transmit and receive data to and from a corresponding node included in the PDN 90 using the PDN connection. Note that APN5 is an APN capable of establishing a PDN connection for SIPTO and allowed to have multiple connectivity using different gateways as endpoint nodes.

First, the UE 10 transmits an attach request to the eNB 20 to initiate an attach request procedure (S902). The UE 10 transmits an APN, with the APN included in the attach request. The UE 10 may transmit a PDN type, with the PDN type included in the attach request to specify the version of the IP address allocated to the UE 10. Note that the UE 10 may transmit the APN to the MME 30, with the APN included in an ATTACH REQUEST message for initiating the attach procedure or may transmit the APN to the MME, with the APN included in another control message in the attach procedure.

The UE 10 may request the establishment of the second PDN connection using APN5 to establish a PDN connection that is a PDN connection for SIPTO and has multiple connectivity using different gateways as endpoint nodes.

Then, the eNB 20 transmits, to the MME 30, the attach request transmitted by the UE 10 (S904). Here, the eNB 20 may include identification information on a neighboring gateway managed by the eNB 20, such as the LGW 40, in the attach request to be transmitted to the MME 30. The eNB 20 may include the LHN ID indicating the network of the LGW 40, in the attach request to be transmitted to the MME 30.

The eNB 20 may notify the MME 30 of such information in advance, instead of using the attach request.

For example, the eNB 20 may notify the MME 30 of the LHN ID, with the LHN ID included in an initial UE message or an uplink NAS transport message, separate from the attach request. The eNB 20 may notify the MME 30 of the information identifying the neighboring gateway, such as the LGW address of the LGW 40, with the information included in the initial UE message or the uplink NAS transport message, separate from the attach request.

The MME 30 receives the attach request from the UE 10 or the eNB 20. Upon receiving the attach request, the MME 30 detects that the UE 10 is to establish the PDN connection.

Here, the information indicating that the UE 10 will establish a PDN connection may be an APN included in the attach request and/or a control message in the attach procedure. In other words, the MME 30 may detect the establishment in accordance with the APN included in the attach request and/or a control message in the attach procedure. The MME 30 may detect the establishment of the PDN connection in accordance with permission information or capability information on the UE 10.

Furthermore, the MME 30 may perform GW selection for establishing the PDN connection in accordance with the APN included in the attach request and/or a control message in the attach procedure. Here, the GW selection is to select a gateway device serving as the endpoint node of the PDN connection to be established by the UE 10.

The MME 30 selects a gateway device in the neighbor eNB 20, such as the LGW 40. Note that the MME 30 may select a gateway device in the neighbor eNB 20, such as the LGW 40, instead of the PGW 60, when APN5 is allowed for SIPTO. Further, when receiving an APN, such as APN5, allowed to establish a PDN connection for SIPTO and allowed to have multiple connectivity using different gateways as endpoint nodes, the MME 30 may select multiple gateways such as the PGW 60 included in the core network 7 and the LGW 40 included in the access network 9.

Here, the MME 30 may query the HSS 70 to select the gateway. The MME 30 may transmit the APN and location information to the HSS 70 and receive identification information on the PGW 60, the LGW 40, and the like.

Note that the MME 30 may select a gateway in the neighbor eNB 20 and establish a PDN connection. The MME 30 may select a gateway in the neighbor eNB 20 using the LGW address of the LGW 40 notified by the eNB 20. The MME 30 may select a gateway in the neighbor eNB 20 using the LHN ID of the LGW 40 notified by the eNB 20.

Here, the MME 30 selects the LGW 40, which is a gateway in the neighbor eNB 20, and the PGW 60 as a gateway in the core network 7.

Then, the MME 30 performs a create session procedure with the selected gateway. Note that when the MME 30 selects multiple gateways for the establishment of a single PDN connection, the MME 30 may perform the create session procedure for each of the selected gateways.

In other words, the MME 30 may perform multiple create session procedures. In this way, the MME 30 may establish multiple bearers using different gateways, for the single PDN connection.

Specifically, the MME 30 may perform the create session procedure with the LGW 40 (S910) and perform the create session procedure with the PGW 60 (S906). Note that either of the session procedures may be performed first. Furthermore, the MME 30 may initiate the second session procedure after the completion of the first session procedure or may initiate the second session procedure without waiting for the completion of the first session establishment procedure.

Figure 10A:
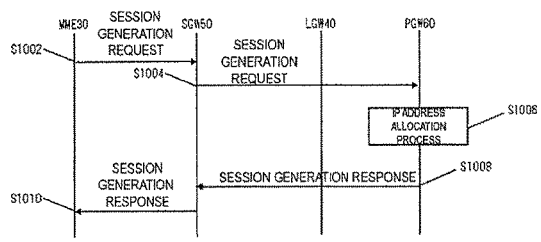
FIGS. 10A, 10B, and 10C are diagrams illustrating a create session procedure according to the embodiment.

An example of the create session procedure between the MME 30 and the PGW 60 will be described with reference to FIG. 10A. This session procedure causes the SGW 50 and the PGW 60 to establish therebetween a bearer to be associated with the PDN connection.

First, the MME 30 transmits a Create Session request to the SGW 40 (S1002). Here, the MME 30 may select, by an SGW selection function in advance, the SGW 40 to which the MME 30 transmits the Create Session request. In the SGW selection function, the location information on the UE may be used for the selection of the SGW 50. For the selection of the SGW 50, an operator policy specified by the mobile network operator may be used.

The MME 30 may include a PGW address, an APN, a PDN type, and an EPS bearer ID in the Create Session request.

Here, the PDN GW address may be identification information on the gateway selected by the MME 30 in the GW selection. Specifically, the PDN GW address may include the identification information identifying the LGW 40 and the identification information identifying the PGW 60. Here, the PDN GW address includes the identification information identifying the PGW 60.

Description will be given in which the MME 30 is assumed to include APN5 as the APN. Note that APN5 may indicate establishment of a PDN connection that is a PDN connection for SIPTO and has multiple connectivity using different gateways as endpoint nodes.

The PDN type may be determined by the MME 30 in accordance with the contract information of the user of the UE 10. The MME 30 may authenticate the PDN type included in the attach request transmitted from the UE 10 to determine the PDN type.

The EPS bearer ID may be bearer identification information allocated by the MME 30 to the UE 10. Note that the EPS bearer ID may be identification information identifying the default bearer.

The SGW 50 transmits a Create Session request to the PGW 40 (S1004). Here, the SGW 50 may determine the PGW 60 to which the SGW 50 transmits the Create Session request in accordance with the identification information on the PDN GW address included in the Create Session request transmitted from the MME 30 to the SGW 50. The SGW 50 may include an APN, an SGW address (U-plane), an SGW TEID (U-plane), an SGW TEID (C-plane), a PDN type, and an EPS bearer ID in the Create Session request.

For the APN, the PDN type, and the EPS bearer ID, the APN, the PDN type, the PDN address, and the EPS bearer ID included in the Create Session request transmitted from the MME 30 may be used, respectively.

Note that the PDN address is an IP address allocated to the UE 10 and used by the UE 10 to transmit and receive user data.

The SGW address (U-plane), the SGW TEID (U-plane), and the SGW TEID (C-plane) may be information managed by the SGW 50 in advance.

The PGW 60 that has received the Create Session request may perform an IP address allocation process (S1006). Here, when the PGW 60 causes a third server device (using DHCP or stateless address configuration) to allocate an IP address, the third server device may provide information indicating the allocation.

The PGW 60 may perform a session establishment procedure. Here, in the session establishment procedure, the PGW 60 may establish a communication path with the default QoS or may establish a communication path with EPS bearer QoS different from the default QoS.

The PGW 60 transmits a Create Session response to the SGW 50 (S1008). The LGW 40 may include a PGW address (U-plane), a PGW TEID (U-plane), a PGW TEID (C-plane), a PDN type, a PDN address, an EPS bearer ID, and an EPS bearer QoS in the Create Session response.

The PGW address (U-plane), the PGW TEID (U-plane), and the PGW TEID (C-plane) may be information managed by the PGW 60 in advance.

The PDN type may be the PDN type included in the Create Session request (S1004) transmitted from the SGW 50.

The PDN address may be an IP address allocated by the PGW 60 to the UE 10. Here, when the allocation of the IP address is performed by the third server device, the third server device may include information indicating the allocation.

The EPS bearer ID and the EPS bearer QoS may be information elements on the case of establishing QoS different from that of the default bearer.

Furthermore, the SGW 50 transmits a Create Session response to the MME 30 (S1010). Here, the SGW 50 may include a PDN type, a PDN address, an SGW address (U-plane), an SGW TEID (U-plane), and an SGW TEID (C-plane), an EPS bearer ID, an EPS bearer QoS, a PGW address (U-plane), and a PGW TEID in the Create Session response.

Here, the PDN type, the PDN address, the EPS bearer ID, the EPS bearer QoS, the PGW address (U-plane), and the PGW TEID may be information elements included in the Create Session response transmitted from the PGW 60 (S1008).

The SGW address (U-plane), the SGW TEID (U-plane), and the SGW TEID (C-plane) may be information elements managed by the SGW 50.

The MME 30 receives the Create Session response. The MME 30 may manage the PDN type, the PDN address, the SGW address (U-plane), the SGW TEID (U-plane), the SGW TEID (C-plane), the EPS bearer ID, the EPS bearer QoS, the PGW address (U-plane), and the PGW TEID included in the Create Session response, together with the APN, the SIPTO permission information, and the LHN ID.

The MME 30 can manage information elements managed for each effective PDN connection before move of the UE in the MME communication path context 342 illustrated in FIG. 7, and information elements managed for the second EPS bearer in the PDN connection.

Figures 10B, 10C:
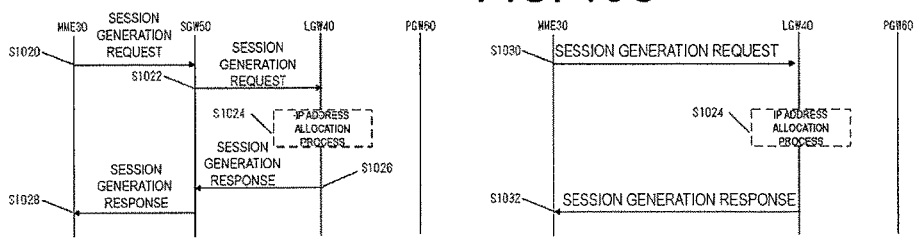

Next, an example of the create session procedure (S910) between the MME 30 and the LGW 40 will be described with reference to FIG. 10B. This session procedure causes the SGW 50 and the LGW 40 to establish therebetween a bearer that is to be associated with the PDN connection.

First, the MME 30 transmits a Create Session request to the SGW 50 (S1020). Here, the MME 30 may select, in advance, the SGW 50 to which the MME 30 transmits the Create Session request, by the SGW selection function. In the SGW selection function, the SGW 50 may be selected using UE location information. For the selection of the SGW 50, an operator policy specified by the mobile network operator may be used.

The MME 30 may include a PDN GW address, an APN, a PDN type, and an EPS bearer ID in the Create Session request.

Here, the PDN GW address may be identification information on the gateway selected by the MME 30 in the GW selection. Specifically, the PDN GW address may include the identification information identifying the LGW 40 and the identification information identifying the PGW 60. Here, the PDN GW address includes the identification information identifying the LGW 40.

A description will be given in which the MME 30 is assumed to include APN5 as the APN. Note that APN5 may indicate to establish a PDN connection that is a PDN connection for SIPTO and has multiple connectivity using different gateways as endpoint nodes.

The PDN type may be determined by the MME 30 in accordance with the contract information of the user of the UE 10. The MME 30 may authenticate the PDN type included in the attach request transmitted from the UE 10 to determine the PDN type.

The EPS bearer ID may be bearer identification information allocated by the MME 30 to the UE 10. Note that the EPS bearer ID may be identification information identifying the default bearer.

The MME 30 may include an indicator indicating whether to allocate an IP address to the LGW 40. Note that the indicator indicating whether to allocate an IP address may be an IP address allocated by the PGW 60. The indicator indicating whether to allocate an IP address may be an APN.

The SGW 50 transmits a Create Session request to the LGW 40 (S1022). Here, the SGW 50 may determine the LGW 40 to which the SGW 50 transmits the Create Session request in accordance with the identification information on the PDN GW address included in the Create Session request transmitted from the MME 30 to the SGW 50. The SGW 50 may include an APN, an SGW address (U-plane), an SGW TEID (U-plane), an SGW TEID (C-plane), a PDN type, and an EPS bearer ID in the Create Session request.

For the APN, the PDN type, and the EPS bearer ID, the APN, the PDN type, the PDN address, and the EPS bearer ID included in the Create Session request transmitted from the MME 30 may be used, respectively.

The SGW address (U-plane), the SGW TEID (U-plane), and the SGW TEID (C-plane) may be information managed by the SGW 50 in advance.

The LGW 40 that has received the Create Session request may perform an IP address allocation process (S1024). Here, the LGW 40 may determine not to allocate an IP address depending on the APN included in the Create Session request. The LGW 40 may determine not to allocate an IP address depending on the indicator included in the Create Session request transmitted by the MME 30.

The LGW 40 may determine to allocate an IP address depending on the indicator included in the Create Session request transmitted by the MME 30.

Here, when the LGW 40 determines to allocate an IP address and causes a third server device (using DHCP or stateless address configuration) to allocate the IP address, the third server device may provide information indicating the allocation.

The LGW 40 may perform a session establishment procedure. Here, in the session establishment procedure, the LGW 40 may establish a communication path with the default QoS, or may establish a communication path with the EPS bearer QoS different from the default QoS.

The LGW 40 transmits a Create Session response to the SGW 50 (S1026). The LGW 40 may include a PGW address (U-plane), a PGW TEID (U-plane), a PGW TEID (C-plane), a PDN type, a PDN address, an EPS bearer ID, and an EPS bearer QoS in the Create Session response.

The PGW address (U-plane), the PGW TEID (U-plane), and the PGW TEID (C-plane) may be information managed by the LGW 40 in advance. Here, the PGW address (U-plane) may be identification information identifying the LGW 40. Each of the PGW TEID (U-plane) and the PGW TEID (C-plane) may be a correlation ID. The correlation ID is identification information on the tunnel communication path in the LGW 40. Note that the correlation ID may be a SIPTO correlation ID specifying that SIPTO is provided.

The PDN type may be the PDN type included in the Create Session request (S1022) transmitted from the SGW 50.

The PDN address may be an IP address allocated by the LGW 40 to the UE 10. Here, when the allocation of the IP address is performed by the third server device, the third server device may include information indicating the allocation.

The EPS bearer ID and the EPS bearer QoS may be information elements on the case of establishing QoS different from that of the default bearer.

Furthermore, the SGW 50 transmits a Create Session response to the MME 30 (S1028). Here, the SGW 50 may include a PDN type, a PDN address, an SGW address (U-plane), an SGW TEID (U-plane), an SGW TEID (C-plane), an EPS bearer ID, an EPS bearer QoS, a PGW address (U-plane), and a PGW TEID in the Create Session response.

Here, the PDN type, the PDN address, the EPS bearer ID, the EPS bearer QoS, the PGW address (U-plane), and the PGW TEID may be information elements included in the Create Session response (S1026) transmitted from the LGW 40.

The SGW address (U-plane), the SGW TEID (U-plane), and the SGW TEID (C-plane) may be information elements managed by the SGW 50.

The MME 30 receives the Create Session response. The MME 30 may manage the PDN type, the PDN address, the SGW address (U-plane), the SGW TEID (U-plane), the SGW TEID (C-plane), the EPS bearer ID, the EPS bearer QoS, the PGW address (U-plane), and the PGW TEID included in the Create Session response, together with the APN, the SIPTO permission information, and the LHN ID.

The MME 30 can manage information elements managed for each effective PDN connection before move of the UE, and information elements managed for each of the first EPS bearers in the PDN connection, in the MME communication path context 342 illustrated in FIG. 7.

Note that the bearer established for the LGW 40 does not need to be the bearer between the SGW 50 and the LGW 40. For example, the bearer established for the LGW 40 may be a bearer established directly by the eNB 20 and the LGW 40.

In this case, the create session procedure performed by the MME 30 may be a procedure different from the procedure described with reference to FIG. 10B.

An example of the create session procedure (S910) in this case will be described with reference to FIG. 10C. Although the Create Session request is transmitted to the LGW 40 via the SGW 50 in FIG. 10B, the MME 30 may transmit the Create Session request directly to the LGW 40. The SGW 50 may be integrally configured with the LGW 40.

First, the MME 30 transmits a Create Session request to the LGW 40 (S1030). Here, the MME 30 may include a PDN GW address, an APN, a PDN type, and an EPS bearer ID in the Create Session request.

Here, the PDN GW address may be identification information on the gateway selected by the MME 30 in the GW selection. Specifically, the PDN GW address may include the identification information identifying the LGW 40 and the identification information identifying the PGW 60. Here, the PDN GW address may include the identification information identifying the LGW 40.

A description will be given in which the MME 30 is assumed to include APN5 as the APN. APN5 may indicate establishment of a PDN connection that is a PDN connection for SIPTO and has multiple connectivity having different gateways as endpoint nodes.

The PDN type may be determined by the MME 30 in accordance with the contract information of the user of the UE 10 or the like. The MME 30 may authenticate the PDN type included in the attach request transmitted from the UE 10 to determine the PDN type.

The EPS bearer ID may be bearer identification information allocated by the MME 30 to the UE 10. Note that the EPS bearer ID may be identification information identifying the default bearer.

The MME 30 may include an indicator indicating whether to allocate an IP address to the LGW 40. The indicator indicating whether to allocate an IP address may be an IP address allocated by the PGW 60. The indicator indicating whether to allocate an IP address may be an APN.

Here, the MME 30 may select, in advance by the SGW selection function, the SGW 50 that is integrally configured with the LGW 40. The SGW selection function may select the SGW 50 with reference to UE location information. For the selection of the SGW 50, an operator policy specified by the mobile network operator may be used.

The LGW 40 that has received the Create Session request may perform an IP address allocation process (S1024). Here, the LGW 40 may determine not to allocate an IP address depending on the APN included in the Create Session request. The LGW 40 may determine not to allocate an IP address depending on the indicator included in the Create Session request transmitted by the MME 30.

The LGW 40 may determine to allocate an IP address depending on the indicator included in the Create Session request transmitted by the MME 30.

Here, when the LGW 40 determines to allocate an IP address and causes a third server device (using DHCP or stateless address configuration) to allocate the IP address, the third server device may provide information indicating the allocation.

The LGW 40 may perform a session establishment procedure. Here, in the session establishment procedure, the LGW 40 may establish a communication path with the default QoS, or may establish a communication path with the EPS bearer QoS different from the default QoS.

The LGW 40 transmits a Create Session response to the MME 30 (S1032). The LGW 40 may include a PGW address (U-plane), a PGW TEID (U-plane), a PGW TEID (C-plane), a PDN type, a PDN address, an EPS bearer ID, and an EPS bearer QoS in the Create Session response.

The PGW address (U-plane), the PGW TEID (U-plane), and the PGW TEID (C-plane) may be information managed by the LGW 40 in advance. Here, the PGW address (U-plane) may be identification information identifying the LGW 40. Each of the PGW TEID (U-plane) and the PGW TEID (C-plane) may be a correlation ID. The correlation ID is identification information on the tunnel communication path in the LGW 40. Note that the correlation ID may be a SIPTO correlation ID specifying that SIPTO is provided.

The PDN type may be the PDN type included in the Create Session request (S1022) transmitted from the SGW 50.

The PDN address may be an IP address allocated by the LGW 40 to the UE 10. Here, when the allocation of the IP address is performed by the third server device, the third server device may include information indicating the allocation.

The EPS bearer ID and the EPS bearer QoS may be information elements on the case of establishing QoS different from that of the default bearer.

Furthermore, the SGW 50 transmits a Create Session response to the MME 30 (S1028). Here, the SGW 50 may include a PDN type, a PDN address, an SGW address (U-plane), an SGW TEID (U-plane), an SGW TEID (C-plane), an EPS bearer ID, an EPS bearer QoS, a PGW address (U-plane), and a PGW TEID in the Create Session response.

Here, the PDN type, the PDN address, the EPS bearer ID, the EPS bearer QoS, the PGW address (U-plane), and the PGW TEID may be information elements included in the Create Session response (S1026) transmitted from the LGW 40.

The SGW address (U-plane), the SGW TEID (U-plane), and the SGW TEID (C-plane) may be information elements managed by the LGW 40.

The MME 30 receives the Create Session response. The MME 30 may manage the PDN type, the PDN address, the SGW address (U-plane), the SGW TEID (U-plane), the SGW TEID (C-plane), the EPS bearer ID, the EPS bearer QoS, the PGW address (U-plane), and the PGW TEID included in the Create Session response, together with the APN, the SIPTO permission information, and the LHN ID.

The MME 30 can manage information elements managed for each effective PDN connection before move of the UE, and information elements managed for each of the first EPS bearers in the PDN connection, in the MME communication path context 342 illustrated in FIG. 7.

As described above, the MME 30 can manage information on a PDN connection, information elements managed for each of the first EPS bearers, and information elements managed for each of the second EPS bearers.

Note that a different IP address may be allocated to the UE 10 in each of the session procedures. Hence, the MME 30 and/or each of the gateways may allocate multiple IP addresses for a single PDN connection.

Alternatively, the same IP address may be allocated to the UE 10 in each of the session procedures. Hence, the MME 30 and/or each of the gateways may allocate a single IP address to a single PDN connection.

A method of allocating the same IP address to the UE 10 in each of the session procedures may be the following method.

For example, a configuration may be made in which the gateway devices obtain the same IP address from a third server device, such as a DHCP server.

Alternatively, at the time of initiating the second session procedure after the completion of the first session procedure, the MME 30 may transmit a Create Session request including the IP address obtained in the first session procedure, to request the allocation of the same IP address. Furthermore, the gateway receiving the Create Session request in the second session procedure may allocate the IP address transmitted by the MME 30.

The above-described procedures allow the SGW 50 to establish a communication path to the PGW 60 and a communication path to the LGW 40 for the PDN connection.

These communication paths can be selected by the SGW 50 and can be selected, for example, at the time of transferring data transmitted by the UE 10 and received from the eNB 20. A communication path selection means of the SGW 50 may be performed in accordance with SGW configuration information. The configuration information may be information obtained from the MME 30. More specifically, the MME 30 may transmit information indicating selection of a communication path for offloading, to the SGW 50. The MME 30 may make this notification at the time of establishing the PDN connection, for example, by transmitting the information, with the information included in a Create Session message.

Alternatively, the MME 30 may make the notification at any timing after establishment of the PDN connection.

More specifically, the information indicating that the MME 30 selects a communication path for offloading may be a correlation ID.

For example, when having obtained the correlation ID from the MME 30, the SGW 50 may select the communication path to the LGW 40. When having not received the correlation ID, the SGW 50 may select the communication path to the PGW 60.

Alternatively, the information may be a correlation ID for SIPTO or a special correlation ID for CSIPTO different from the correlation ID for SIPTO.

Alternatively, the information may be different identification information indicating selection of an offload communication path.

Note that these communication paths may be bearers connected to the devices, such as the LGW 40 and the PGW 60.

Through the above-described procedure, the create session procedure is completed.

Returning to FIG. 9, description will be given of the subsequent steps of the attach procedure. The MME 30 transmits an initial context setup request/attach accept to the eNB 20A (S914).

Note that the MME 30 makes a notification of information on the first EPS bearer and information on the second EPS bearer in a PDN connection that is to be newly established, with the information included in the initial context setup request/attach accept.

The attach accept may include the APN, the PDN type, the PDN address, the EPS bearer ID, and the EPS bearer QoS. Here, the PDN address may include the IP addresses allocated to the first EPS bearer and the second EPS bearer.

The initial context setup request may include the EPS bearer QoS, the EPS bearer ID, the SGW TEID (U-plane), the SGW address (U-plane). When a PDN connection using an LGW as an end point node (a PDN connection for SIPTO@LN) is established, the initial context request may include a SIPTO correlation ID.

Here, the EPS bearer QoS, the EPS bearer ID, the SGW TEID (U-plane), and the SGW address (U-plane) included in the initial context setup request may be included for each EPS bearer. Specifically, the initial context setup request may include the EPS bearer QoS, the EPS bearer ID, the SGW TEID (U-plane), and the SGW address (U-plane) of the first EPS bearer, and the EPS bearer QoS, the EPS bearer ID, the SGW TEID (U-plane), and the SGW address (U-plane) of the second EPS bearer.

The eNB 20 receives the initial context setup request/attach accept. The eNB 20 determines to establish a radio bearer with the UE 10, in accordance with the EPS bearer ID and the EPS bearer QoS included in the initial context setup request. Here, the eNB 20 may determine an E-RAB ID in accordance with the EPS bearer ID and the EPS bearer QoS.

Note that when managing the LGW 40 as a neighboring gateway, the eNB 20 may establish a radio bearer in accordance with the information elements associated with the LGW 40. Here, the eNB 20 may establish a radio bearer with the UE 10 in accordance with the EPS bearer ID including the correlation ID and the EPS bearer QoS.

The eNB 20 may manage an SGW TEID (U-plane), an SGW address (U-plane), and a SIPTO correlation ID included in a modify bearer request.

The above procedure allows the eNB 20 to manage an MME UE S1 AP ID, a GUMMEI, a global eNB ID, a tracking area ID, an E-RAB ID, and a UE ID, as information elements managed for each PDN connection in the eNB communication path context 242 illustrated in FIG. 5. The eNB 20 can manage an EPS bearer ID, an EPS bearer QoS, and a transport address as information elements managed for each EPS bearer in the PDN connection.

In this way, the eNB 20 may establish a communication path to the SGW 50 and a communication path to the LGW 40. Note that the communication path to the LGW 40 may be established in response to receipt of a correlation ID from the MME 30.

These communication paths can be selected by the eNB 20 and can be selected, for example, at the time of transferring data received from the UE 10. A communication path selection means of the eNB 20 may be performed in accordance with eNB configuration information. The configuration information may be information obtained from the MME 30. More specifically, the MME 30 may transmit, to the eNB 20, information indicating selection of a communication path for offloading. The MME 30 may make this notification at the time of establishing the PDN connection, for example, by transmitting the information, with the information included in a Create Session response message.

Alternatively, the MME 30 may make the notification at any timing after establishment of the PDN connection.

More specifically, the information indicating that the MME 30 selects a communication path for offloading may be a correlation ID.

For example, when having obtained the correlation ID from the MME 30, the eNB 20 may select the communication path to the LGW 40. When having not received the correlation ID, the eNB 20 may select the communication path to the SGW 50 connecting to the PGW 60.

Alternatively, the information may be a correlation ID for SIPTO or a special correlation ID for CSIPTO different from the correlation ID for SIPTO.

Alternatively, the information may be different identification information indicating selection of an offload communication path.

These communication paths may be bearers connected to the devices, such as the LGW 40 and the SGW 50. Next, the eNB 20 transmits an RRC connection reconfiguration to the UE 10 (S916). Note that the eNB 20 includes an attach accept in an RRC connection reconfiguration notification destined for the UE 10. Here, the eNB 20 may include the attach accept, separate from the RRC connection reconfiguration notification destined for the UE 10. In other words, the eNB 20 makes a notification of the information on the newly established PDN connection by transferring the attach accept.

The UE 10 receives the RRC connection reconfiguration and the attach accept from the eNB 20. Here, the UE 10 detects the information on the newly established PDN connection included in the attach accept from the eNB 20, and manages the information.

Note that the information on the PDN connection may be an APN, a PDN type, a PDN address, an EPS bearer ID, and an EPS bearer QoS. Next, the UE 10 performs an IP address obtainment process (S917). Here, the UE 10 may obtain the PDN address included in the attach accept as an IP address. Note that when multiple PDN addresses are included in an ATTACH ACCEPT message, multiple IP addresses may be stored for the PDN connection.

When the PDN address included in the attach accept includes information indicating obtainment of an IP address in accordance with DHCP, the UE 10 may obtain the IP address from the DHCP server. Here, the DHCP server may be an external server different from the core network 7 or the LGW 40.

Note that the UE 10 may obtain multiple IP addresses for the PDN connection from the DHCP server and store the IP addresses.

When the PDN address included in the attach accept includes information indicating obtainment of an IP address in accordance with the stateless address auto-configuration, the UE 10 may receive a router advertisement (RA) from a router device and obtain the IP address in accordance with the router advertisement. Here, the router device may be an external server different from the core network 7 or may be the LGW 40.

Note that the UE 10 may obtain multiple IP addresses for the PDN connection from the router device and manage the IP addresses.

When the UE 10 stores multiple IP addresses for a single PDN connection, the UE 10 may select and use these IP addresses at the time of transmitting user data.

An IP address selection means may be performed in accordance with configuration information of the UE 10. The configuration information may be information obtained from the MME 30 or the eNB 20. More specifically, the MME 30 or the eNB 20 may transmit information indicating selection of a communication path for offloading, to the UE 10. The MME 30 may make this notification at the time of establishing the PDN connection, for example, by transmitting the information, with the information included in an ATTACH ACCEPT message.

Alternatively, the MME 30 may make the notification at any timing after establishment of the PDN connection.

More specifically, the information indicating that the MME 30 selects a communication path for offloading may be priority information configured for each IP address.

Alternatively, the information may be a correlation ID for SIPTO or a special correlation ID for CSIPTO different from the correlation ID for SIPTO.

Alternatively, the information may be different identification information indicating selection of an offload communication path.

The UE 10 may select an IP address to be used for transmission of user data, in accordance with such information. The UE 10 obtains the IP address in the above-described method, and manages the IP address as the PDN connection. The UE 10 can manage information on the PDN connection in the UE communication path context 142 indicated in (a) before move in FIG. 3 and can transmit uplink data in the PDN connection.

The UE 10 transmits an RRC connection reconfiguration complete (S918). The eNB 20 receives the RRC connection reconfiguration complete as a response to the RRC connection reconfiguration (S916) and transmits an initial context setup response to the MME 30 (S920).

The UE 10 also transmits direct transfer to the eNB 20 (S922). Here, an attach complete may be included in the direct transfer. The EPS bearer ID may be included in the attach complete.

The eNB 20 receives the direct transfer from the UE 10 and transfers the attach complete included in the direct transfer to the MME 30 (S924). The MME 30 that has received the initial context setup response and the attach complete transmits a modify bearer request to the SGW 50 (S926). The SGW 50 receives the modify bearer request from the MME 30 and transmits a modify bearer response to the MME 30 (S928).

The above procedure allows the PDN connection to be established between the UE 10 and each of the PGW 60 and the LGW 40. In other words, the UE 10 can manage an APN, an allocated PDN type, an IP address, a default bearer, an EPS bearer ID, and an EPS bearer QoS in the UE communication path context 142 illustrated in FIG. 3, as information on the PDN connection.

The eNB 20 can manage an MME UE S1 AP ID, a GUMMEI, a global eNB ID, a tracking area ID, an E-RAB ID, and a UE ID in the eNB communication path context 242 illustrated in FIG. 5, as information on the PDN connection. The eNB 20 can manage an EPS bearer ID, an ESP bearer QoS, and a transport address as information elements managed for the EPS bearer in the PDN connection. Note that the transport address may be the IP address of the SGW, the TEID of the SGW, or the IP address or the correlation ID of the LGW.

Furthermore, the MME 30 can manage an APN, a PDN type, an IP address, SIPTO permission (information), a LHN ID, a PDN GW address (C-plane), a PDN GW TEID (C-plane), and a default bearer in the MME communication path context 342 illustrated in FIG. 7, as information on the PDN connection.

The MME 30 can manage an EPS bearer ID, an SGW IP address (S1-u), an SGW TEID (S1-u), a PGW IP address (U-plane), a PGW TEID (U-plane), and an EPS bearer QoS as information elements managed for each EPS bearer in the PDN connection.

Through the above, the UE 10 can transmit and receive data via the PGW 60 or LGW 40 using the PDN connection. In other words, the UE 10, the eNB 20, and/or the SGW 50 can establish a PDN connection constituted of a communication path to the LGW 40 and a communication path to the PGW 60.

Note that for the communication of the UE 10 using the PDN connection, the communication path connected to the LGW 40 can be preferentially selected in accordance with the configuration information on the UE 10, the eNB 20, and/or the SGW 50. Hence, the communication of the UE 10 using the PDN connection can be performed using the communication path connected to the LGW 40, in accordance with the configuration information on the UE 10, the eNB 20, and/or the SGW 50.

Note that when having established a PDN connection by performing an attach procedure using APN5, the UE 10 manages APN5 as the APN, PDN type 1 as the allocated PDN type, IP address 1 and IP address 2 as the IP address, and EPS bearer ID 1 as the default bearer, and manages EPS bearer ID 5 as the EPS bearer ID and EPS bearer QoS 1 as the EPS bearer QoS among information elements managed for each EPS bearer in the PDN connection, as illustrated in the UE communication path context 142 in FIG. 3.

Note that when multiple IP addresses are not obtained at the time of establishing a PDN connection, the UE 10 may manage IP address 1 only.

In this case, as illustrated in the eNB communication path context 242 in FIG. 5, the eNB 20 manages MME UE S1 AP ID 1 as the MME UE S1 AP ID, GUMMEI1 as the GUMMEI, global eNB ID 1, tracking area ID 1 as the tracking area ID, E-RAB ID 1 as the E-RAB ID, and UE ID 1 as the UE ID, manages EPS bearer ID 1 as the EPS bearer ID, EPS bearer QoS 1 as the EPS bearer QoS, and transport address 1 (such as a PGW address, a PGW TEID, an LGW address, or a correlation ID) as the transport address among information elements managed for the first EPS bearer, and manages EPS bearer ID 2 as the EPS bearer ID, EPS bearer QoS 2 as the EPS bearer QoS, and transport address 2 as the transport address (such as a PGW address, a PGW TEID, an LGW address, or a correlation ID) among information elements managed for the second EPS bearer.

As illustrated in the MME communication path context 342 in FIG. 7, the MME 30 manages APN 5 as the APN, PDN type 1 as the PDN type, IP address 1 and IP address 2 as the IP address, permission of CSIPTO as the permission of SIPTO, LHN ID 1 as the LHN ID, LGW address 1 and PGW address 1 as the PDN GW address (C-plane), correlation ID 1 and PGW TEID 1 as the PDN GW TEID (C-plane), and EPS bearer ID 1 as the default bearer, manages EPS bearer ID 5 as the EPS bearer ID, LGW IP address 1 as the PGW IP address (U-plane), correlation ID 1 as the PGW TEID (U-plane), and EPS bearer QoS 1 as the EPS bearer QoS among the information elements managed for the first EPS bearer, and manages EPS bearer ID 7 as the EPS bearer ID, SGW IP address 1 as the SGW IP address (S1-u), SGW TEID 1 as the SGW TEID (S1-u), PGW IP address 1 as the PGW IP address (U-plane), PGW TEID 1 as the PGW TEID (U-plane), and EPS bearer QoS 2 as the EPS bearer QoS among information elements managed for the second EPS bearer.

1.3.2 PDN Connectivity Procedure

Establishment of a PDN connection using APN5 can also be established in accordance with a PDN connectivity procedure without being limited to the attach procedure. Note that when a PDN connection for SIPTO can be established and a PDN connection having multiple connectivity using different gateways as endpoint nodes has been established, in the attach procedure, the PDN connectivity procedure does not need to be performed.

Figure 11:
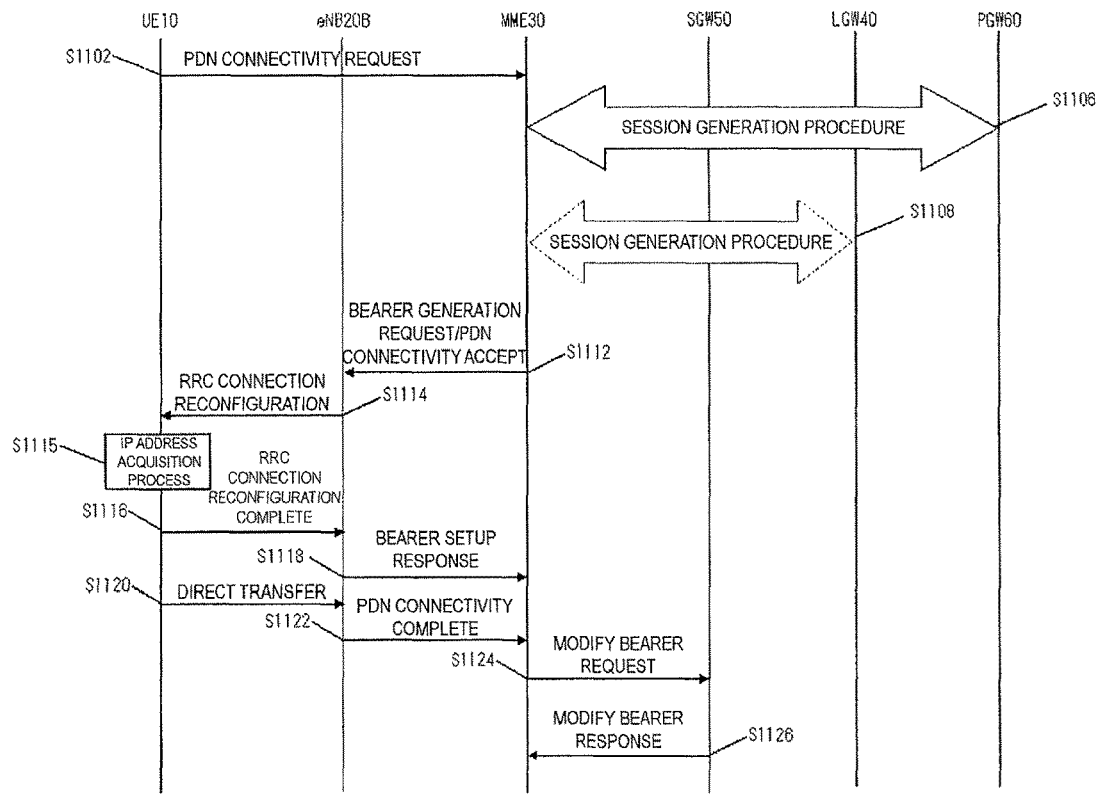
FIG. 11 is a diagram illustrating a PDN connectivity procedure according to the embodiment.

A UE-initiated PDN connectivity procedure will be described with reference to FIG. 11. First, the UE 10 transmits a PDN connectivity request to the MME 30 (S1102).

The UE 10 may transmit the APN and the PDN type included at the time of establishing the PDN connection, with the APN and the PDN type included in the PDN connectivity request.

Here, the UE 10 may request the establishment of a second PDN connection using APN5 to establish a PDN connection that is a PDN connection for SIPTO and is allowed to have multiple connectivity using different gateways as endpoint nodes.

Note that the PDN connectivity request transmitted by the UE 10 is transmitted via the eNB 20. Here, the eNB 20 may include identification information on a neighboring gateway managed by the eNB 20, such as the LGW 40, in the PDN connectivity request to be transmitted to the MME 30. The eNB 20 may include the LHN ID indicating the network of the LGW 40, in the PDN connectivity request to be transmitted to the MME 30.

Here, when the eNB 20 does not manage the LGW 40, the eNB 20 does not need to include the identification information on the neighboring gateway. When the eNB 20 does not manage the LGW 40, the eNB 20 does not need to include the LHN ID indicating the network of the LGW 40, in the PDN connectivity request.

The eNB 20 may notify the MME 30 of such information in advance, instead of using the PDN connectivity request.

For example, the eNB 20 may notify the MME 30 of the LHN ID, with the LHN ID included in an initial UE message or an uplink NAS transport message, separate from the PDN CONNECTIVITY REQUEST message. The eNB 20 may notify the MME 30 of the information identifying the neighboring gateway, such as the LGW address of the LGW 40, with the information included in an initial UE message or an uplink NAS transport message, separate from the PDN CONNECTIVITY REQUEST message.

The MME 30 receives the PDN connectivity request from the UE 10 or the eNB 20. The MME 30 may perform GW selection for establishing the PDN connection in accordance with the APN included in the PDN connectivity request. The MME 30 may detect the establishment of the PDN connection in accordance with permission information or capability information on the UE 10.

The MME 30 selects a gateway device in the neighbor eNB 20, such as the LGW 40. Note that the MME 30 may select a gateway device in the neighbor eNB 20, such as the LGW 40, instead of the PGW 60, when SIPTO is allowed for APN5. Further, when having received an APN allowed to establish a PDN connection for SIPTO and allowed to have multiple connectivity using different gateways as endpoint nodes, such as APN5, the MME 30 may select multiple gateways such as the PGW 60 included in the core network 7 and the LGW 40 included in the access network 9.

The MME 30 may query the HSS 70 to select the gateway. The MME 30 may transmit the APN to the HSS 70 and receive the identification information on the PGW 60.

Note that the MME 30 may select a gateway in the neighbor eNB 20 to establish a PDN connection. The MME 30 may select a gateway in the neighbor eNB 20 using the LGW address of the LGW 40 notified by the eNB 20. The MME 30 may select a gateway in the neighbor eNB 20 using the LHN ID of the LGW 40 notified by the eNB 20.

Here, the MME 30 selects the LGW 40, which is a gateway in the neighbor eNB 20, and the PGW 60 as a gateway in the core network 7.

Then, the MME 30 performs a create session procedure with the selected gateway. Note that when having selected multiple gateways for the establishment of a single PDN connection, the MME 30 may perform the create session procedure for each of the selected gateways.

In other words, the MME 30 may perform multiple create session procedures. In this way, the MME 30 may establish multiple bearers using different gateways, for the single PDN connection.

Specifically, the MME 30 may perform the create session procedure with the LGW 40 (S1108) and perform the create session procedure with the PGW 60 (S1106). Note that either of the session procedures may be performed first. Furthermore, the MME 30 may initiate the second session procedure after the completion of the first session procedure or may initiate the second session procedure without waiting for the completion of the first session establishment procedure.

Note that the same procedure as that described with reference to FIG. 10A can be used for the create session procedure between the MME 30 and the PGW 60 (S1106), and therefore the detailed description thereof is omitted. The same procedure as that described with reference to FIG. 10B or FIG. 10C can be used for the create session procedure between the MME 30 and the LGW 40 (S1108), and therefore the detailed description thereof is omitted.

Subsequently, the MME 30 transmits a bearer setup request/PDN connectivity accept to the eNB 20B (S1112). Note that the MME 30 makes a notification of information on the first EPS bearer and the second EPS bearer in a PDN connection that is to be newly established, with the information included in the bearer setup request/PDN connectivity accept.

The bearer generation request may include an EPS bearer QoS, a PDN connectivity accept, an SGW TEID (U-plane), and an SGW address (U-plane).

When a PDN connection using an LGW as an endpoint node (PDN connection for SIPTO@LN) is established, the initial context request may include an SIPTO correlation ID.

Here, the EPS bearer QoS, the EPS bearer ID, the SGW TEID (U-plane), and the SGW address (U-plane) included in the initial context setup request may be included for each EPS bearer. Specifically, the initial context setup request may include the EPS bearer QoS, the EPS bearer ID, the SGW TEID (U-plane), and the SGW address (U-plane) of the first EPS bearer, the EPS bearer QoS, the EPS bearer ID, the SGW TEID (U-plane), and the SGW address (U-plane) of the second EPS bearer, the EPS bearer QoS, the EPS bearer ID, the SGW TEID (U-plane), and the SGW address (U-plane) of the second EPS bearer, and the EPS bearer QoS, the EPS bearer ID, the SGW TEID (U-plane), and the SGW address (U-plane) of the second EPS bearer.

The PDN connectivity accept may include an APN, a PDN type, a PDN address, and an EPS bearer ID.

The eNB 20 receives the bearer setup request/PDN connectivity accept. The eNB 20B determines establishment of a radio bearer with the UE 10 in accordance with the EPS bearer ID and the EPS bearer QoS included in the bearer setup request. Here, the eNB 20A may determine the E-RAB ID in accordance with the EPS bearer ID and the EPS bearer QoS.

Note that when managing the LGW 40 as a neighboring gateway, the eNB 20 may establish a radio bearer in accordance with the information elements associated with the LGW 40. Here, the eNB 20 may establish a radio bearer with the UE 10 in accordance with the EPS bearer ID including the correlation ID and the EPS bearer QoS.

The eNB 20 may manage an SGW TEID (U-plane) and an SGW address (U-plane) included in a modify bearer request.

The above procedure allows the eNB 20 to manage an MME UE S1 AP ID, a GUMMEI, a global eNB ID, a tracking area ID, an E-RAB ID, and a UE ID, as information elements managed for each PDN connection in the eNB communication path context 242 illustrated in FIG. 5. The eNB 20 can manage an EPS bearer ID, an EPS bearer QoS, and a transport address as information elements managed for each EPS bearer in the PDN connection.

In this way, the eNB 20 may establish a communication path to the SGW 50 and a communication path to the LGW 40. Note that the communication path to the LGW 40 may be established in response to receipt of a correlation ID from the MME 30.

These communication paths can be selected by the eNB 20 and can be selected, for example, at the time of transferring data received from the UE 10. A communication path selection means of the eNB 20 may be performed in accordance with eNB configuration information. The configuration information may be information obtained from the MME 30. More specifically, the MME 30 may transmit information indicating selection of a communication path for offloading, to the eNB 20. The MME 30 may make this notification at the time of establishing the PDN connection, for example, by transmitting the information, with the information included in a Create Session response message.

Alternatively, the MME 30 may make the notification at any timing after establishment of the PDN connection.

More specifically, the information indicating that the MME 30 selects a communication path for offloading may be a correlation ID.

For example, when having obtained the correlation ID from the MME 30, the eNB 20 may select the communication path to the LGW 40. When having not received the correlation ID, the eNB 20 may select the communication path to the SGW 50 connecting to the PGW 60.

Alternatively, the information may be a correlation ID for SIPTO or a special correlation ID for CSIPTO different from the correlation ID for SIPTO.

Alternatively, the information may be different identification information indicating selection of an offload communication path.

Note that these communication paths may be bearers connected to the devices, such as the LGW 40 and the SGW 50.

Subsequently, the eNB 20B transmits an RRC connection reconfiguration to the UE 10 (S1114). Note that the eNB 20B includes a PDN connectivity accept in the RRC connection reconfiguration destined for the UE 10. Here, the eNB 20B may include the PDN connectivity accept in a notification different from the RRC connection reconfiguration notification destined for the UE 10. In other words, the eNB 20 makes a notification of information on the newly established PDN connection by transferring the PDN connectivity accept.

The UE 10 receives the RRC connection reconfiguration and the PDN connectivity accept from the eNB 20. Here, the UE 10 detects the information on the newly established PDN connection included in the PDN connectivity accept from the eNB 20B, and manages the information.

Note that the information on the PDN connection may be an APN, a PDN type, a PDN address, an EPS bearer ID, and an EPS bearer QoS.

Subsequently, the UE 10 performs an IP address obtaining process (S1115). Here, the UE 10 may obtain, as the IP address, the PDN address included in the PDN connectivity accept. Here, the UE 10 may obtain multiple IP addresses. Note that when multiple PDN addresses are included in the ATTACH ACCEPT message, multiple IP addresses may be stored for the PDN connection.

When the PDN address included in the PDN connectivity accept includes information indicating obtainment of an IP address in accordance with DHCP, the UE 10 may obtain the IP address from the DHCP server. Here, the DHCP server may be an external server different from the core network 7, or may be the PGW 60.

Note that the UE 10 may obtain multiple IP addresses for the PDN connection from the DHCP server and store the IP addresses.

When the PDN address included in the PDN connectivity accept includes information indicating obtainment of an IP address through stateless address auto-configuration, the UE 10 may receive a router advertisement (RA) from a router device and obtain the IP address in accordance with the router advertisement. Here, the router device may be an external server different from the core network 7, or may be the PGW 60.

Note that the UE 10 may obtain multiple IP addresses for the PDN connection from the router device and store the IP addresses.

When the UE 10 stores multiple IP addresses for a single PDN connection, the UE 10 may select and use these IP addresses at the time of transmitting user data.

An IP address selection means may be performed in accordance with configuration information of the UE 10. The configuration information may be information obtained from the MME 30 or the eNB 20. More specifically, the MME 30 or the eNB 20 may transmit information indicating selection of a communication path for offloading, to the UE 10. The MME 30 may make this notification at the time of establishing the PDN connection, for example, by transmitting the information, with the information included in an ATTACH ACCEPT message.

Alternatively, the MME 30 may make the notification at any timing after establishment of the PDN connection.

More specifically, the information indicating that the MME 30 selects a communication path for offloading may be priority information configured for each IP address.

Alternatively, the information may be a correlation ID for SIPTO or a special correlation ID for CSIPTO different from the correlation ID for SIPTO, or the like.

Alternatively, the information may be different identification information indicating selection of an offload communication path.

The UE 10 may select an IP address to be used for transmission of user data, in accordance with such information.

The UE 10 obtains the IP address by the above method and manages the IP address as the second PDN connection therein. The UE 10 can manage information on the PDN connection in the UE communication path context 142 illustrated in FIG. 3 and can transmit uplink data in the second PDN connection.

The UE 10 transmits an RRC connection reconfiguration complete to the eNB 20B (S1116). The eNB 20B receives the RRC connection reconfiguration complete as a response to the RRC connection reconfiguration (S1114) and transmits a bearer setup response to the MME 30 (S1118).

The UE 10 transmits direct transfer to the eNB 20B (S1120). Here, a PDN connectivity complete may be included in the direct transfer. An EPS bearer ID may be included in the PDN connectivity complete.

The eNB 20B receives the direct transfer from the UE 10 and transfers the PDN connectivity complete included in the direct transfer to the MME 30 (S1122). The MME 30 that has received the bearer setup response and the PDN connectivity complete transmits a modify bearer request to the SGW 50 (S1124).

The SGW 50 transmits the modify bearer request to the PGW 60 in response to receipt of the modify bearer request (S1126).

The PGW 60 receives the modify bearer request and transmits, as a response to the modify bearer request, a modify bearer response to the SGW 50 (S1128).

The SGW 50 transmits, as a response to the modify bearer request transmitted by the MME 30, a modify bearer response to the MME 30 (S1130).

The above procedure allows the UE 10 to establish a PDN connection between the UE 10 and each of the PGW 60 and the LGW 40. In other words, the UE 10 can manage an APN, an allocated PDN type, an IP address, a default bearer, an EPS bearer ID, and an EPS bearer QoS in the UE communication path context 142 illustrated in FIG. 3, as information on the second PDN connection.

The eNB 20 can manage an MME UE S1 AP ID, a GUMMEI, a global eNB ID, a tracking area ID, an E-RAB ID, a UE ID, and a transport address in the eNB communication path context 242 illustrated in FIG. 5, as information on the second PDN connection. The eNB 20 can manage an EPS bearer ID, an ESP bearer QoS, and a transport address as information elements managed for the EPS bearer in the PDN connection. Note that the transport address may be the IP address of the SGW, the TEID of the SGW, or the IP address or the correlation ID of the LGW.

Furthermore, the MME 30 can manage an APN, a PDN type, an IP address, permission (information) of SIPTO, a PDN GW address (C-plane), a PDN GW TEID (C-plane), and a default bearer in the MME communication path context 342 illustrated in FIG. 7, as information on the PDN connection.

The MME 30 can manage an EPS bearer ID, an SGW IP address (S1-u), an SGW TEID (S1-u), a PGW IP address (U-plane), a PGW TEID (U-plane), and an EPS bearer QoS as information elements managed for each EPS bearer in the PDN connection.

Through the above, the UE 10 can transmit and receive data via the PGW 60 or LGW 40 using the second PDN connection. In other words, the UE 10, the eNB 20, and/or the SGW 50 can establish a PDN connection constituted of a communication path to the LGW 40 and a communication path to the PGW 60.

Note that for the communication of the UE 10 using the PDN connection, the communication path connected to the LGW 40 can be preferentially selected in accordance with the configuration information on the UE 10, the eNB 20, and/or the SGW 50. Hence, the communication of the UE 10 using the PDN connection can be performed using the communication path connected to the LGW 40, in accordance with the configuration information on the UE 10, the eNB 20, and/or the SGW 50. Note that when having performed a PDN connectivity procedure using APN5 to establish a PDN connection, the UE 10 manages APN5 as the APN, PDN type 1 as the allocated PDN type, IP address 1 and IP address 2 as the IP address, and EPS bearer ID 1 as the default bearer, and manages EPS bearer ID 5 as the EPS bearer ID and EPS bearer QoS 1 as the EPS bearer QoS among information elements managed for each EPS bearer in the PDN connection, as illustrated in the UE communication path context 142 in FIG. 3.

Note that when multiple IP addresses are not obtained at the time of establishing a PDN connection, the UE 10 may store IP address 1 only.

In this case, as illustrated in the eNB communication path context 242 in FIG. 5, the eNB 20 manages MME UE S1 AP ID 1 as the MME UE S1 AP ID, GUMMEI1 as the GUMMEI, global eNB ID 1, tracking area ID 1 as the tracking area ID, E-RAB ID 1 as the E-RAB ID, and UE ID 1 as the UE ID, manages EPS bearer ID 1 as the EPS bearer ID, EPS bearer QoS 1 as the EPS bearer QoS, and transport address 1 (such as a PGW address, a PGW TEID, an LGW address, or a correlation ID) as the transport address among information elements managed for the first EPS bearer, and manages EPS bearer ID 2 as the EPS bearer ID, EPS bearer QoS 2 as the EPS bearer QoS, and transport address 2 as the transport address (such as a PGW address, a PGW TEID, an LGW address, or a correlation ID) among information elements managed for the second EPS bearer.

As illustrated in the MME communication path context 342 in FIG. 7, the MME 30 manages APN 5 as the APN, PDN type 1 as the PDN type, IP address 1 and IP address 2 as the IP address, permission of CSIPTO as the permission of SIPTO, LHN ID 1 as the LHN ID, LGW address 1 and PGW address 1 as PDN GW address (C-plane), correlation ID 1 and PGW TEID 1 as the PDN GW TEID (C-plane), and EPS bearer ID 1 as the default bearer, manages EPS bearer ID 5 as the EPS bearer ID, LGW IP address 1 as the PGW IP address (U-plane), correlation ID 1 as the PGW TEID (U-plane), and EPS bearer QoS 1 as the EPS bearer QoS among the information elements managed for the first EPS bearer, and manages EPS bearer ID 7 as the EPS bearer ID, SGW IP address 1 as the SGW IP address (S1-u), SGW TEID 1 as the SGW TEID (S1-u), PGW IP address 1 as the PGW IP address (U-plane), PGW TEID 1 as the PGW TEID (U-plane), and EPS bearer QoS 2 as the EPS bearer QoS among information elements managed for the second EPS bearer.

1.3.3 Service Request Procedure

Next, the UE 10 performs a service request procedure to resume data transmission and reception using a PDN connection established by the UE 10 and each of the PGW 60 and the LGW 40 in the attach procedure or the PDN connectivity procedure. Here, when having completed data transmission and reception in the PDN connection, the UE 10 makes a transition from a connected state (active state) to an idle state. When performing the service request procedure, the UE 10 can make a transition from the idle state to the connected state and initiate data transmission and reception using the PDN connection. Note that the idle state may be a state in which the radio bearer and/or radio resource between the UE 10 and the eNB 20 has been released.

Figure 12:
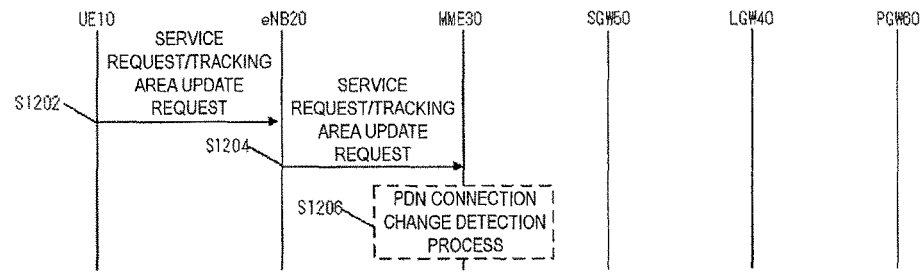
FIG. 12 is a diagram illustrating a service request procedure according to the embodiment.

Note that in the service request procedure described in the present embodiment, the UE 10, the eNB 20, the SGW 50, and/or the MME 30 can select a bearer that delivers user data from among the multiple bearers constituting the PDN connection. In other words, the UE 10, the eNB 20, the SGW 50, and/or the MME 30 can change the bearer that delivers user data. The service request procedure in the UE 10 will be described with reference to FIG. 12.

First, the UE 10 transmits a service request to the eNB 20 (S1202). Here, the UE 10 may transmit the service request to the eNB 20, with the service request included in the RRC message. Here, the service request may be a tracking area update request.

Subsequently, the eNB 20 transfers the service request to the MME 30 (S1204). Here, the eNB 20 may transmit the service request to the MME 30, with the service request included in the initial UE message. The initial UE message may include a SIPTO LGW transport address and the LHN ID managed by the eNB 20. Here, when the eNB 20 does not manage the LGW 40, the initial UE message need not include the SIPTO LGW transport address (the LGW address of the LGW 40) or the LHN ID. Here, the service request may be a tracking area update request.

The MME 30 receives the service request or the tracking area update request from the UE 10 or the eNB 20. Here, the MME 30 performs a PDN connection change detection process (S1206). Here, the MME 30 determines whether to change the bearer used for PDN connection communication, in accordance with the service request transmitted from the UE 10. Specifically, the MME 30 determines whether to change the communication path used for the PDN connection from the first EPS bearer to the second EPS bearer.

Note that the first bearer may be a bearer for offload communication established with the LGW 40, and the second bearer may be a bearer established with the PGW 60.

More specifically, the first bearer may be a bearer established by the SGW 50 and the LGW 40, and the second bearer may be a bearer established by the SGW 50 and the PGW 60. Other bearers constituting other PDN connections and information on the bearers need not be changed.

Alternatively, the first bearer may be a bearer established by the eNB 20 and the LGW 40, and the second bearer may be a bearer established by the SGW 50 and the PGW 60. Other bearers constituting other PDN connections and information on the bearers need not be changed.

As described above, the bearer that is changed may be one or some of the bearers configured for data transmission and reception through communication using the PDN connection.

Furthermore, bearers which can be changed may be established by a separate create session procedure, and the bearers may be managed as different sessions. Hence, it can be said that the bearer change performed through this procedure is the same as changing one or some of the sessions constituting the PDN connection.

Here, the MME 30 may determine whether to change the bearer by detecting that the first EPS bearer in the PDN connection is effective. Here, the first EPS bearer in the effective PDN connection may be detected on the basis of the UE 10 not having changed the base station device to which the UE 10 is connected, or the LGW 40 being the optimal gateway device for the offloading even when the UE 10 has changed the base station device to which the UE 10 is connected.

More specifically, whether the first EPS bearer in the PDN connection is effective may be detected in accordance with the LHN ID or the SIPTO LGW transport address (the LGW address of the LGW 40) included in the initial UE message transmitted from the eNB 20.

The MME 30 may detect the effectiveness by the LHN ID managed in the MME communication path context 342 managed by the MME 30, or by the LGW IP address in the PGW IP address (U-plane).

The MME 30 may detect that the first EPS bearer in the PDN connection is effective, by comparing the LHN ID or the SIPTO LGW transport address (the LGW address of the LGW 40) included in the initial UE message transmitted from the eNB 20 and the LHN ID or the LGW IP address in the PGW IP address (U-plane) managed in the MME communication path context 342.

Here, when not detecting that the first EPS bearer in the PDN connection is effective, the MME 30 may determine to change the first EPS bearer to the second EPS bearer in the PDN connection.

For example, the MME 30 may detect that the first EPS bearer in the PDN connection is not effective, for example, when the MME 30 detects that the LGW 40 is not the optimal gateway for offloading, when the MME 30 detects an optimal gateway device different from the LGW 40, or on the basis of a factor that the base station device to which the UE 10 connects is not allowed to establish a PDN connection for SIPTO using the LGW as an endpoint node.

On the other hand, when the APN managed in the MME communication path context 342 is APN5 and the permission of SIPTO includes information indicating permission of CSIPTO, the MME 30 may determine to change the first EPS bearer to the second EPS bearer in the PDN connection. As described above, the EPS bearer may be changed on the basis of the fact that the PDN connection is established using APN5. Here, changing the first EPS bearer to the second EPS bearer in the PDN connection may be the same as changing the endpoint node of the gateway device from the LGW 40 (or the communication path to the LGW 40) to the PGW 60 (or the communication path to the PGW 60).

Note that the change procedure for changing the first EPS bearer to the second EPS bearer in the PDN connection may be performed in accordance with determination made by the operator, such as the policy of the network operator, regardless of which APN is used to establish the PDN connection.

1.3.3.1 Continuation of Service Request Procedure

A description will be given of a case in which the MME 30 detects that the first EPS bearer in the PDN connection is effective in the modify bearer detection process (S1206) and determines to continue the service request procedure. The subsequent steps of the service request procedure will be described with reference to FIG. 13.

Figure 13:
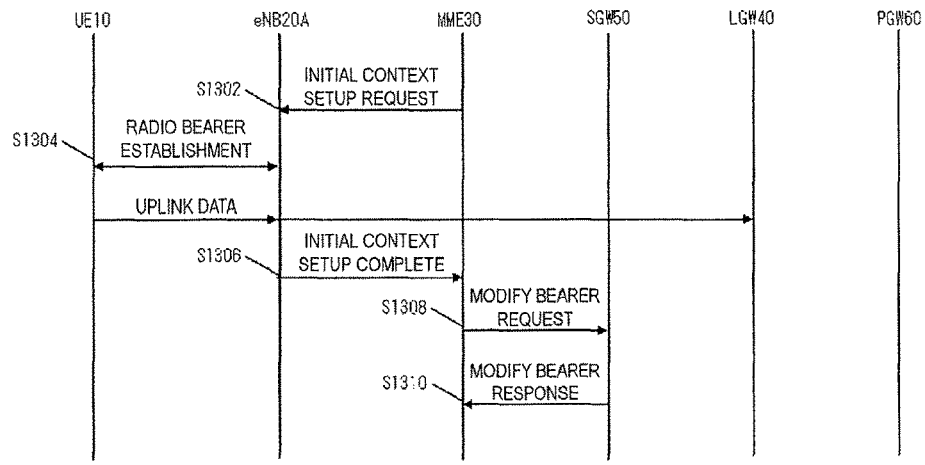
FIG. 13 is a diagram illustrating subsequent steps in the service request procedure according to the embodiment.

FIG. 13 illustrates the procedure for the UE 10 to continue the service request procedure when the UE 10 does not move from the eNB 20A for which the attach procedure or the PDN connectivity procedure has been performed. However, even when moving to another eNB 20, the UE 10 may initiate the service request procedure as long as the first EPS bearer is effective.

The MME 30 that has detected that the first EPS bearer in the PDN connection is effective transmits an initial context setup request to the eNB 20 (S1302). The initial context setup request may include the SGW address, the SGW TEID, the EPS bearer QoS, and the SIPTO correlation ID. Here, the MME 30 may transmit identification information for selecting a bearer and/or identification information requesting to change the bearer to be selected with the identification information included in the initial context request. Specifically, the identification information may be information indicating not changing from the first EPS bearer. The identification information may be information identifying the first EPS bearer. The identification information may be a group of information elements associated with the first EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The eNB 20 receives the initial context setup request. The eNB 20 may select a bearer in accordance with the received identification information. Note that the eNB 20 may manage the SGW address, the SGW TEID, the EPS bearer QoS, and the SIPTO correlation ID included in the initial context setup request.

Note that the eNB 20 may determine to use the EPS bearer configured by the first EPS bearer, in accordance with the information indicating not changing from the first EPS bearer, the information indicating the first EPS bearer, or the information associated with the first EPS bearer, included in the initial context setup request.

Subsequently, the eNB 20 establishes a radio bearer with the UE 10 (S1304). The eNB 20 may establish a radio bearer in accordance with the EPS bearer QoS. Furthermore, the eNB 20 may generate a radio parameter for establishing the radio bearer in accordance with the EPS bearer QoS.

Here, the eNB 20 may transmit, to the UE 10, identification information for selecting an IP address and/or identification information requesting to change the IP address to be selected. Specifically, the identification information may be information indicating not changing from the first IP address. The identification information may be information identifying IP address 1. The identification information may be a group of information elements associated with IP address 1. For example, the group of information elements may include an EPS bearer ID, an SGW IP address, an SGW TEID, a PGW IP address, a PGW TEID (SIPTO correlation ID), an EPS bearer QoS, and IP address 1. In this case, the MME 30 may transmit such identification information to the UE 10 with the identification information included in control information to be transmitted to the UE 10 to establish the radio link.

The UE 10 may receive the identification information and select an IP address in accordance with the received identification information.

The UE 10 that has established the radio bearer transmits uplink data to the eNB 20. Note that the eNB 20 transfers the uplink data from the UE 10 to the LGW 40. The LGW 40 transfers the uplink data from the eNB 20 to the PDN 90.

The eNB 20 that has established the radio bearer transmits the initial context setup complete to the MME 30 (S1306).

The eNB 20 may transmit identification information for selecting a bearer and/or identification information requesting to change the bearer to be selected with the identification information included in the initial context setup complete. Specifically, the identification information may be information indicating not changing from the first EPS bearer. The identification information may be information identifying the first EPS bearer. The identification information may be a group of information elements associated with the first EPS bearer. For example, the group of information elements may include an EPS bearer ID, an SGW IP address, an SGW TEID, a PGW IP address, a PGW TEID (SIPTO correlation ID), an EPS bearer QoS, and an IP address.

Furthermore, an eNB address, a list of accepted EPS bearers, a list of rejected EPS bearers, and an SGW TEID may be included in the initial context setup complete. Here, the eNB 20 may include at least identification information identifying the PDN connection in the list of accepted EPS bearers.

The MME 30 receives the initial context setup complete from the eNB 20. When the list of rejected EPS bearers is included, information on each of the corresponding PDN connections may be deleted.

Subsequently, the MME 30 transmits a modify bearer request (S1308).

The MME 30 may transmit identification information for selecting a bearer and/or identification information for requesting to change the bearer that is selected, by including the information in the modify bearer request. Specifically, the identification information may be information indicating not changing from the first EPS bearer. The identification information may be information identifying the first EPS bearer. The identification information may be a group of information elements associated with the first EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The MME 30 may also include an eNB address and an S1 TEID in the modify bearer request. Note that the eNB address and the S1 TEID included in the modify bearer request may be information elements by which the MME 30 is associated with the PDN connection.

The SGW 50 receives the modify bearer request from the MME 30. The SGW 50 may select a bearer in accordance with the received identification information. More specifically, the SGW 50 may select a first bearer for communication using the PDN connection.

The SGW 50 can transmit downlink data destined for the UE 10 in the PDN connection corresponding to the eNB address and the S1 TEID, on the basis of the eNB address and the S1 TEID included in the modify bearer request.

The SGW 50 transmits, as a response to the modify bearer request, a modify bearer response to the MME 30 (S1310).

The above-described procedure allows data to be transmitted and received using the first EPS bearer in the PDN connection between the UE 10 and the LGW 40.

1.3.3.2 Bearer Change in Service Request Procedure

Description will be given of a case in which the MME 30 does not detect that the first EPS bearer in the PDN connection is effective in the modify bearer detection process (S1206) and determines to change the first bearer to the second bearer in the service request procedure. The EPS modify bearer procedure using the service request procedure will be described with reference to FIG. 14.

Figure 14:
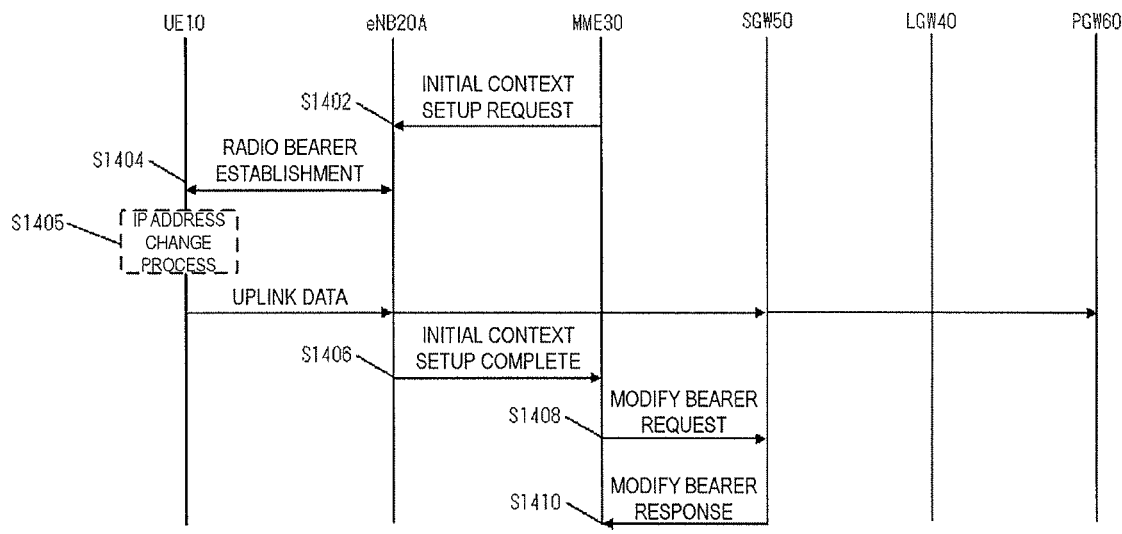
FIG. 14 is a diagram illustrating subsequent steps in the service request procedure according to the embodiment.
Figure 15:
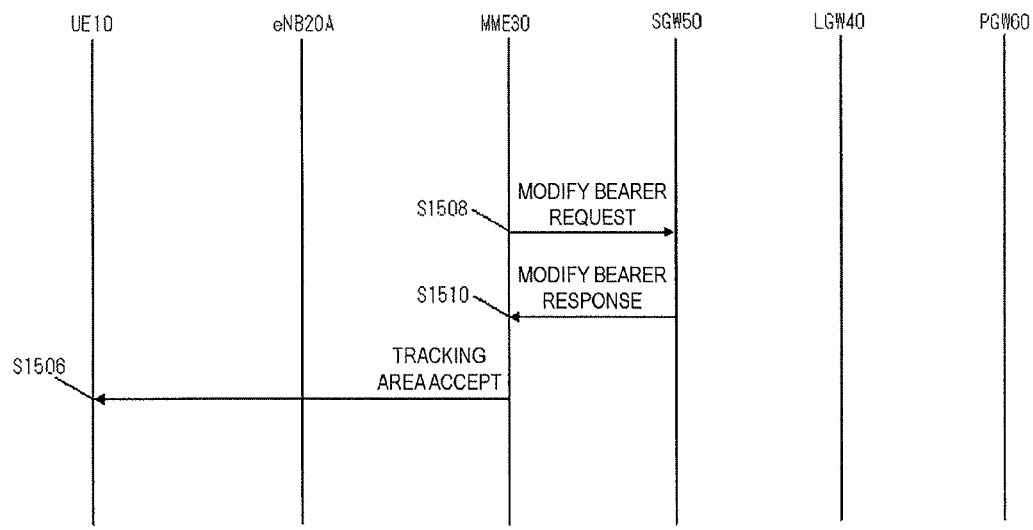
FIG. 15 is a diagram illustrating a tracking area update procedure according to the embodiment.

FIG. 14 illustrates the EPS modify bearer procedure using the service request procedure in which the UE 10 moves from the eNB 20 for which the UE 10 has performed the attach procedure or the PDN connectivity procedure. However, even when moving to another eNB 20, the UE 10 may perform the EPS bearer change using the service request procedure as long as the first EPS bearer in the PDN connection is not effective.

Here, changing the first bearer may be the same as changing the first EPS bearer using the LGW 40 in the PDN connection as an endpoint node to the second EPS bearer using the PGW 60 in the PDN connection as an endpoint node.

Furthermore, performing the EPS modify bearer procedure in the service request procedure allows for transmission and reception of user data using the second EPS bearer using the PGW 60 as the endpoint node, instead of transmission and reception of user data using the first EPS bearer using the LGW 40 as the endpoint node.

The MME 30 that has not detected that the first EPS bearer in the PDN connection is effective transmits an initial context setup request to the eNB 20 (S1402).

An SGW address, an SGW TEID, and an EPS bearer QoS may be included in the initial context setup request. Here, the MME 30 may transmit identification information for selecting a bearer and/or identification information requesting to change the bearer that is to be selected with the identification information included in the initial context request. Specifically, the identification information may be information indicating a change to the second EPS bearer. The identification information may be information identifying the second EPS bearer. The identification information may be a group of information elements associated with the second EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The eNB 20 receives the initial context setup request. The eNB 20 may select a bearer in accordance with the received identification information. Note that the eNB 20 may manage the SGW address, the SGW TEID, and the EPS bearer QoS included in the initial context setup request.

Note that the eNB 20 may determine to use the EPS bearer configured by the second EPS bearer, in accordance with the information indicating changing from the first EPS bearer, the information indicating the second EPS bearer, or the information associated with the second EPS bearer included in the initial context setup request.

Subsequently, the eNB 20 establishes a radio bearer with the UE 10 (S1404). The eNB 20 may establish a radio bearer in accordance with the EPS bearer QoS. Furthermore, the eNB 20 may generate a radio parameter for establishing the radio bearer in accordance with the EPS bearer QoS.

Here, the eNB 20 may transmit, to the UE 10, identification information for selecting an IP address and/or identification information requesting to change the IP address that is selected. Specifically, the identification information may be information indicating changing from the first IP address. The identification information may be information identifying IP address 2. The identification information may be a group of information elements associated with IP address 2. For example, the group of information elements may include an EPS bearer ID, an SGW IP address, an SGW TEID, a PGW IP address, a PGW TEID (SIPTO correlation ID), an EPS bearer QoS, and IP address 2. In this case, the MME 30 may transmit such identification information to the UE 10 with the identification information included in control information that is transmitted to the UE 10 to establish the radio link.

The UE 10 may receive the identification information and select an IP address in accordance with the received identification information.

Here, the eNB 20 may notify the UE 10 of the IP address included in the initial context setup request.

On the other hand, for the establishment of the radio bearer with the eNB 20, the UE 10 may perform an IP address change process (S1405). Here, upon notification of the IP address from the eNB 20, the UE 10 may change the IP address in the information elements managed for the PDN connection. The UE 10 may perform transmission and reception of data using the notified IP address.

The UE 10 that has established the radio bearer transmits uplink data to the eNB 20. Note that the eNB 20 transfers the uplink data from the UE 10 to the LGW 40. The LGW 40 transfers the uplink data from the eNB 20 to the PDN 90.

The eNB 20 that has established the radio bearer transmits the initial context setup complete to the MME 30 (S1406).

The eNB 20 may transmit identification information for selecting a bearer and/or identification information requesting to change the bearer that is selected with the identification information included in the initial context setup complete. Specifically, the identification information may be information indicating changing from the first EPS bearer. The identification information may be information identifying the second EPS bearer. The identification information may be a group of information elements associated with the second EPS bearer. For example, the group of information elements may include an EPS bearer ID, an SGW IP address, an SGW TEID, a PGW IP address, a PGW TEID (SIPTO correlation ID), an EPS bearer QoS, and an IP address.

Furthermore, an eNB address, a list of accepted EPS bearers, a list of rejected EPS bearers, and an SGW TEID may be included in the initial context setup complete. Here, the eNB 20 may include at least identification information identifying the PDN connection in the list of accepted EPS bearers.

The MME 30 receives the initial context setup complete from the eNB 20. When the list of rejected EPS bearers is included, information on each of the corresponding PDN connections may be deleted.

Subsequently, the MME 30 transmits a modify bearer request (S1408).

The MME 30 may transmit identification information for selecting a bearer and/or identification information requesting to change the bearer that is selected with the identification information included in the modify bearer request. Specifically, the identification information may be information indicating a change from the first EPS bearer. The identification information may be information identifying the second EPS bearer. The identification information may be a group of information elements associated with the second EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The MME 30 may also include an eNB address and an S1 TEID in the modify bearer request. Note that the eNB address and the S1 TEID included in the modify bearer request may be information elements by which the MME 30 is associated with the PDN connection.

The SGW 50 receives the modify bearer request from the MME 30. The SGW 50 may select a bearer in accordance with the received identification information. More specifically, the SGW 50 may select a second bearer for communication using the PDN connection.

The SGW 50 can transmit downlink data destined for the UE 10 in the PDN connection corresponding to the eNB address and the S1 TEID, on the basis of the eNB address and the S1 TEID included in the modify bearer request.

The SGW 50 transmits, as a response to the modify bearer request, a modify bearer response to the MME 30 (S1410).

The above procedure allows data to be transmitted and received using the second EPS bearer in the PDN connection between the UE 10 and the LGW 40.

1.3.3.3 Bearer Change in Tracking Area Update Procedure

The service request transmitted by the UE 10 (S1202) may be a tracking area update request, and the service request transmitted by the eNB 20 may be a tracking area update request.

The MME 30 that has received the tracking area update request may perform the PDN connection change process (S1206). Note that a description of the PDN connection change process has already been given, and hence a detailed description thereof is omitted.

The MME 30 may transmit, to the SGW 50, identification information for selecting a bearer and/or identification information requesting to change the bearer to be selected, in response to receipt of the tracking area update request. Specifically, the identification information may be information indicating not changing from the first EPS bearer. The identification information may be information identifying the first EPS bearer. The identification information may be a group of information elements associated with the first EPS bearer. For example, the group of information elements may include an EPS bearer ID, an SGW IP address, an SGW TEID, a PGW IP address, a PGW TEID (SIPTO correlation ID), an EPS bearer QoS, and an IP address.

More specifically, the MME 30 may transmit the identification information, with the identification information included in a Create Session request or a modify bearer request (S1508).

The SGW 50 receives the identification information from the MME 30. The SGW 50 may select a bearer in accordance with the received identification information. More specifically, the SGW 50 may select a first bearer for communication using the PDN connection.

The SGW 50 receives the modify bearer request or the Create Session request from the MME 30 and transmits the modify bearer response or the Create Session response to the MME 30 (S1510).

The MME 30 may also transmit, to the eNB 20, identification information for selecting a bearer and/or identification information requesting to change the bearer that is selected. Specifically, the identification information may be information indicating not changing from the first EPS bearer. The identification information may be information identifying the first EPS bearer. The identification information may be a group of information elements associated with the first EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The eNB 20 receives the initial context setup request. The eNB 20 may select a bearer in accordance with the received identification information.

The eNB 20 may receive the identification information and select a bearer in accordance with the received identification information.

Subsequently, the MME 30 transmits a tracking area accept to the UE 10 (S1506).

Here, the information elements that the MME 30 includes in the tracking area accept may vary depending on whether the first EPS bearer is used or the second EPS bearer is used in the PDN connection.

First, a case of using the first EPS bearer will be described. Note that a description on determination to use the first EPS bearer in the PDN connection change detection process (S1206) has already been given, and hence a detailed description thereof is omitted.

The MME 30 may transmit identification information for selecting an IP address and/or identification information requesting to change the IP address that is selected. Specifically, the identification information may be information indicating not changing from the first IP address. The identification information may be information identifying IP address 1. The identification information may be a group of information elements associated with IP address 1. For example, the group of information elements may include an EPS bearer ID, an SGW IP address, an SGW TEID, a PGW IP address, a PGW TEID (SIPTO correlation ID), an EPS bearer QoS, and IP address 1. In this case, the MME 30 may transmit such identification information to the UE 10 with the information included in the tracking area accept.

The UE 10 may receive the identification information and select an IP address in accordance with the received identification information.

The information indicating not changing from the first EPS bearer may be included. The MME 30 may include information indicating the first EPS bearer in the tracking area accept. The MME 30 may include information elements associated with the first EPS bearer in the tracking area accept. For example, the EPS bearer ID or the IP address may be included.

The above procedure allows for a change to the first EPS bearer between the UE 10 and the LGW 40 in the PDN connection.

Next, a case of using the second EPS bearer will be described. Note that a description on determination to use the second EPS bearer in the PDN connection change detection process (S1206) has already been given of, and hence a detailed description thereof is omitted.

The MME 30 may transmit, to the SGW 50, identification information for selecting a bearer and/or identification information requesting to change the bearer that is selected, in response to receipt of the tracking area update request. Specifically, the identification information may be information indicating changing from the first EPS bearer. The identification information may be information identifying the second EPS bearer. The identification information may be a group of information elements associated with the second EPS bearer. For example, the group of information elements may include an EPS bearer ID, an SGW IP address, an SGW TEID, a PGW IP address, a PGW TEID (SIPTO correlation ID), an EPS bearer QoS, and an IP address.

More specifically, the MME 30 may transmit the identification information, with the identification information included in a Create Session request or a modify bearer request (S1508).

The SGW 50 receives the identification information from the MME 30. The SGW 50 may select a bearer in accordance with the received identification information. More specifically, the SGW 50 may select a first bearer for communication using the PDN connection.

The SGW 50 receives the modify bearer request or the Create Session request from the MME 30 and transmits the modify bearer response or the Create Session response to the MME 30 (S1510).

The MME 30 may also transmit, to the eNB 20, identification information for selecting a bearer and/or identification information requesting to change the bearer that is selected. Specifically, the identification information may be information indicating changing from the first EPS bearer. The identification information may be information identifying the second EPS bearer. The identification information may be a group of information elements associated with the second EPS bearer. For example, the group of information elements may include an EPS bearer ID, an SGW IP address, an SGW TEID, a PGW IP address, a PGW TEID (SIPTO correlation ID), an EPS bearer QoS, and an IP address.

The eNB 20 receives the initial context setup request. The eNB 20 may select a bearer in accordance with the received identification information.

The eNB 20 may receive the identification information and select a bearer in accordance with the received identification information.

Subsequently, the MME 30 transmits the tracking area accept to the UE 10 (S1506).

In this transmission, the MME 30 may transmit identification information for selecting an IP address and/or identification information requesting to change the IP address that is selected. Specifically, the identification information may be information indicating changing from the first IP address. The identification information may be information identifying IP address 2. The identification information may be a group of information elements associated with IP address 2. For example, the group of information elements may include an EPS bearer ID, an SGW IP address, an SGW TEID, a PGW IP address, a PGW TEID (SIPTO correlation ID), an EPS bearer QoS, and IP address 2.

The eNB 20 receives the initial context setup request. The eNB 20 may select a bearer in accordance with the received identification information. In this case, the MME 30 may transmit such identification information to the UE 10 with the identification information included in the tracking area accept.

The UE 10 may receive the identification information and select an IP address in accordance with the received identification information. Note that the MME 30 may transmit such identification information with the information included in the tracking area accept.

The above procedure allows for a change to the second EPS bearer in the PDN connection between the UE 10 and the PGW 60. Here, a change to the second bearer may be the same as a change from the first EPS bearer using the LGW 40 in the PDN connection as an endpoint node to the second EPS bearer using the PGW 60 in the PDN connection as an endpoint node.

Furthermore, performing the EPS modify bearer procedure in the service request procedure allows for transmission and reception of user data using the second EPS bearer using the PGW 60 as the endpoint node in the established PDN connection, instead of transmission and reception of user data using the first EPS bearer using the LGW 40 as the endpoint node. The above-described procedures according to the present embodiment allows the UE 10, the MME 30, the eNB 20, the SGW 30, and/or the gateway devices, such as the LGW 40 and the PGW 60, to change one or some of communication paths and/or one or some of sessions to be used for communication in the PDN connection. Furthermore, this change allows the gateway to be changed. More specifically, this change allows for a change to a communication path and/or a session with a different gateway.

Note that such a change may be triggered by the service request procedure and/or the tracking area update procedure initiated by the UE 10.

The PDN connection on which such a change is performed may be a PDN connection established using an APN associated with special permission information, such as APN5. Hence, a PDN connection established using an APN, such as APN1, not associated with permission information corresponding to such a change need not change to a communication path and/or a session with a different gateway at the time of performing the service request procedure and/or the tracking area update procedure.

Hence, whether to perform the change may be determined in accordance with APN and permission information.

Note that the UE 10 may establish, with multiple APNs, multiple PDN connections for the respective APNs.

2. Modified Example

As described above, the method described in the above embodiment can be applied to the stored information and the process in each of the devices including the UE 10, and hence detailed description thereof is omitted.

The embodiment and multiple modified examples relating to the embodiments have been described above. The modified examples may be individually applied to the embodiment. The embodiment of the invention has been described in detail thus far with reference to the drawings, but the specific configuration is not limited to the embodiment. Other designs and the like that do not depart from the essential spirit of the invention also fall within the scope of the patent claims.

Additionally, the program run on each of the devices in the embodiments is a program that controls a CPU (program that causes a computer to function) to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a digital versatile disc (DVD), a magneto optical disc (MO), a mini disc (MD), a compact disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like in accordance with instructions included in those programs.

When delivering these programs to market, the programs can be stored in a portable recording medium, or transferred to a server computer connected via a network such as the Internet. In this case, the storage device serving as the server computer is of course also included in the present invention.

Additionally, each device in the above-described embodiments may be partially or completely realized as a large scale integration (LSI) circuit, which is a typical integrated circuit. The functional blocks of each device may be individually realized as chips, or may be partially or completely integrated into a chip. The circuit integration technique is not limited to LSI, and the integrated circuits for the functional blocks may be realized as dedicated circuits or a general-purpose processor. Furthermore, if advances in semiconductor technology produce circuit integration technology capable of replacing LSI, it is of course possible to use integrated circuits based on the technology.

REFERENCE SIGNS LIST

1 Mobile communication system
5 IP mobile communication network
7 Core network
9 LTE access network
10 UE
20 eNB
30 MME
40 LGW
50 SGW
60 PGW
70 HSS
80 PCRF
90 PDN

The invention claimed is:
1. A User Equipment (UE) comprising:
transmitting and receiving circuitry; and
control circuitry configured to establish a first connection to a data network, wherein
the first connection includes two or more simultaneous connections between the UE and the data network via two or more endpoint nodes in a core network,
the two or more simultaneous connections include at least a connection using an Access Point Name (APN) via a first endpoint node and a connection using the APN via a second endpoint node, and
in a first procedure for changing an endpoint node of the first connection from the first endpoint node to the second endpoint node,
the transmitting and receiving circuitry receives a first control information from the core network, and
after a reception of the first control information, the control circuitry performs a transmission and/or reception of data via the first connection by using a second IP address associated with the second endpoint node of the first connection, instead of a transmission and/or reception of data via the first connection by using a first IP address associated with the first endpoint node of the first connection.

2. The UE according to claim 1,
wherein the transmitting and receiving circuitry is configured to receive a second control information from the core network in a second procedure for establishing the first connection,
after the reception of the second control information, the transmitting and receiving circuitry is able to execute the first procedure with the first connection, and
the second control information contains information indicating that a type of the first connection is IPv4 or IPv6.

3. The UE according to claim 1,
wherein after the reception of the first control information, the control circuitry maintains the first IP address and the second IP address.

4. A User Equipment (UE) comprising:
transmitting and receiving circuitry; and
control circuitry, wherein
a second connection is a established by the UE to a data network via one or more endpoint nodes in a core network,
the control circuitry establishes the second connection comprising, simultaneously, a connection using an Access Point Name (APN) via a third endpoint node and a connection using the APN via a fourth endpoint node, and
in a third procedure for changing an endpoint node of the second connection from the third endpoint node to the fourth endpoint node,
the transmitting and receiving circuitry receives a third control information from the core network, and
after a reception of the third control information, the control circuitry performs a transmission and/or reception of data via the second connection by using a fourth IP address associated with the fourth endpoint node of the second connection, instead of a transmission and/or reception of data via the second connection by using a third IP address associated with the third endpoint node of the second connection.

5. The UE according to claim 4,
wherein the transmitting and receiving circuitry is configured to receive a fourth control information from the core network in a fourth procedure for establishing the second connection,
after the reception of the fourth control information, the transmitting and receiving circuitry is able to execute the third procedure with the second connection, and
the fourth control information contains information indicating that a type of the second connection is IPv6.

6. The UE according to claim 4,
wherein the control circuitry maintains the third IP address and the fourth IP address, even if the UE performs transmission and/or reception of data via the second connection by using the fourth IP address, instead of a transmission and/or reception of data via the second connection by using the third IP address.

7. A communication control method performed by a User Equipment (UE), the communication control method comprising:
establishing a first connection to a data network, wherein
the first connection includes two or more simultaneous connections between the UE and the data network via two or more endpoint nodes in a core network, and
the two or more simultaneous connections include at least a connection using an Access Point Name (APN) via a first endpoint node and a connection using the APN via a second endpoint node; and
in a first procedure for changing an endpoint node of the first connection from the first endpoint node to the second endpoint node:
receiving a first control information from the core network; and
after a reception of the first control information, performing a transmission and/or reception of data via the first connection by using a second IP address associated with the second endpoint node of the first connection, instead of a transmission and/or reception of data via the first connection by using a first IP address associated with the first endpoint node of the first connection.

8. A communication control method performed by a User Equipment (UE), the method comprising:

establishing a second connection between the UE and a data network via one or more endpoint nodes in a core network, wherein the second connection includes, simultaneously, a connection using an Access Point Name (APN) via a third endpoint node and a connection using the APN via a fourth endpoint node; and in a third procedure for changing an endpoint node of the second connection from the third endpoint node to the fourth endpoint node:

receiving a third control information from the core network; and after a reception of the third control information, performing a transmission and/or reception of data via the second connection by using a fourth IP address associated with the fourth endpoint node of the second connection, instead of a transmission and/or reception of data via the second connection by using a third IP address associated with the third endpoint node of the second connection.

* * * * *

UNITED STATES PATENT AND TRADEMARK OFFICE
CERTIFICATE OF CORRECTION

PATENT NO. : 11,102,826 B2
APPLICATION NO. : 15/953125
DATED : August 24, 2021
INVENTOR(S) : Masayuki Enomoto et al.

It is certified that error appears in the above-identified patent and that said Letters Patent is hereby corrected as shown below:

In the Claims

At Column 50, Line 1 (in Claim 4):
Replace:
"is a established"
With:
--is established--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*